United States Patent [19]

Abraham et al.

[11] Patent Number: 5,731,786
[45] Date of Patent: Mar. 24, 1998

[54] COMPACTION OF SATPS INFORMATION FOR SUBSEQUENT SIGNAL PROCESSING

[75] Inventors: Charles Abraham, Cupertino; Peter Van Wyck Loomis, Sunnyvale; John F. Schipper, Palo Alto, all of Calif.

[73] Assignee: Trimble Navigation Limited, Sunnyvale, Calif.

[21] Appl. No.: 367,051

[22] Filed: Dec. 29, 1994

[51] Int. Cl.$^6$ .............................. H04B 7/185; G01S 5/02
[52] U.S. Cl. ............................................................. 342/357
[58] Field of Search .................................................. 342/357

[56] References Cited

U.S. PATENT DOCUMENTS

| | | | |
|---|---|---|---|
| 5,422,816 | 6/1995 | Sprague et al. | 364/449 |
| 5,436,632 | 7/1995 | Sheynblat | 342/357 |

Primary Examiner—Theodore M. Blum
Attorney, Agent, or Firm—John Schipper

[57] ABSTRACT

A method for characterization of data measurements made on signals received from a plurality of SATPS satellites that facilitates post-processing of these data to determine pseudoranges, code phases, carrier phases, pseudorange rate corrections, carrier phase corrections, spatial location, velocity and time coordinates and other variables of interest for an SATPS user. The SATS may be any satellite-based location determination system, such as GPS or GLONASS. The approach uses six indices h1, h2, h3, h4, h5 and h6, with the first index h1 including the total solution coordinates $(t_n, x_n, y_n, z_n)$ for the location fix time $t=t_n$ at which measurements are made, and the spatial location and velocity coordinates. The second and third indices h2 and h3 specify the in-view satellite constellation that provided the SATPS signals and the IODC parameter. The fourth index h4 represents the specific parameter set used to model the ephemeris, almanac and clock correction parameters needed for the M satellites for a given coordinate fix. The fifth index h5 represents the parameter set used to model signal propagation delay through the ionosphere and troposphere. The sixth index h6 represents the location solution method and method parameters used to determine the spatial location, location fix time, clock bias and/or velocity coordinates for each coordinate fix. For each time stamp value in the index h1, information specified by the six indices may be used to reconstruct the information needed to determine pseudoranges, pseudorange rates, carrier phase signals, corrections to these variables, and other quantities of interest in an SATPS. The information specified by the six indices may a minimal set in which information specified by one index is not also specified by another index. Another method uses selected portions of the information specified by the collective indices h1, h2, h3, h4, h5 and h6, using a collective index H that may be divided into index segments.

21 Claims, 7 Drawing Sheets

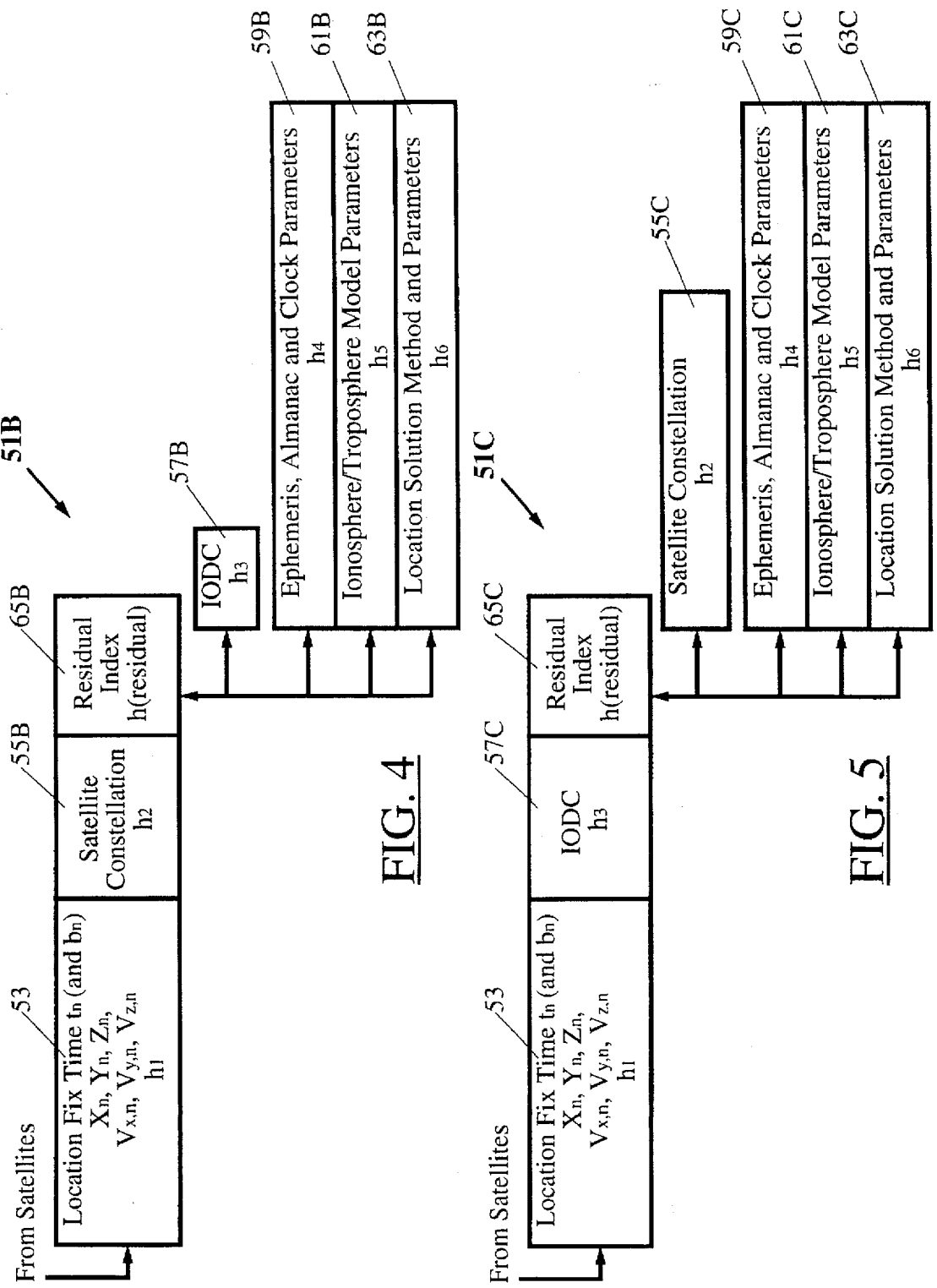

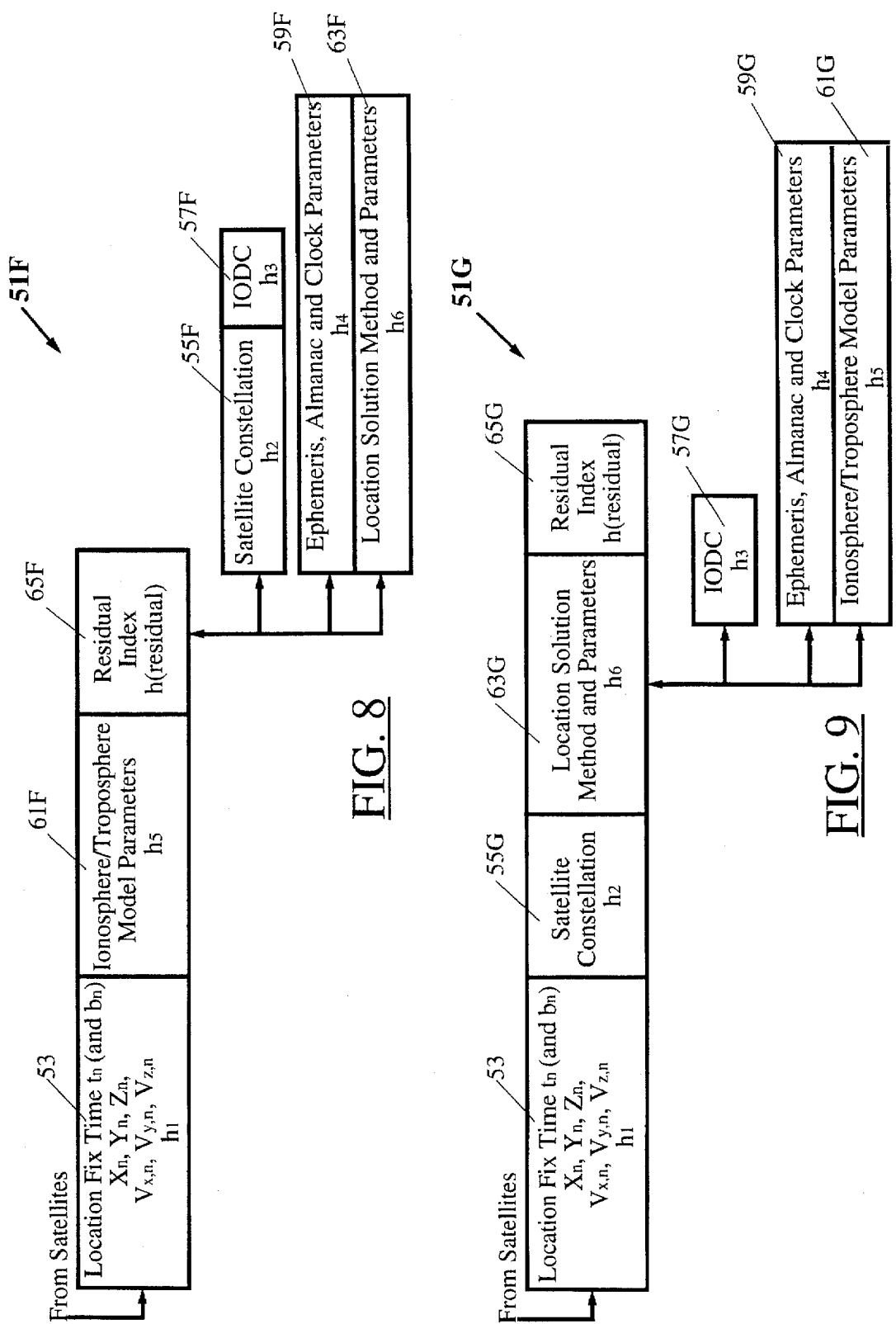

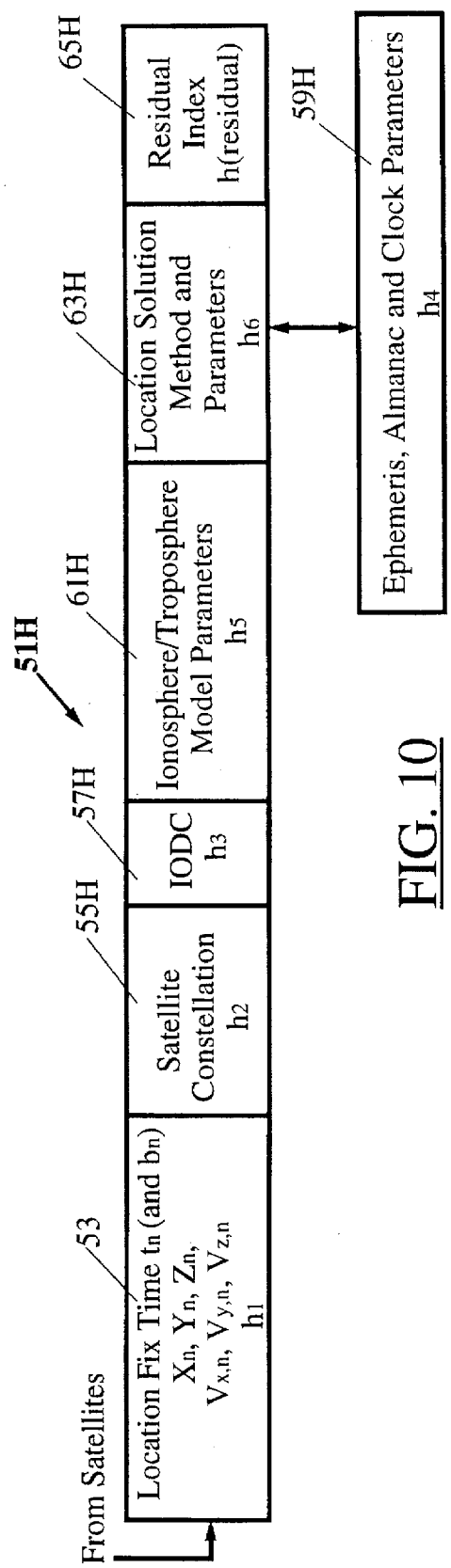
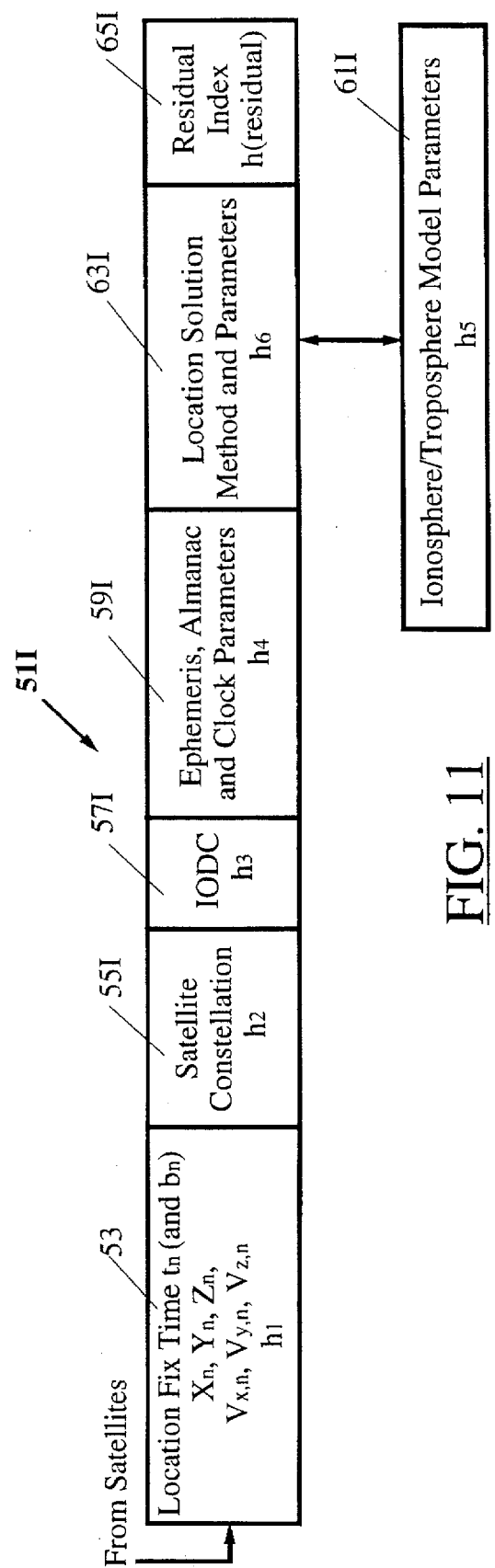
FIG. 10
FIG. 11

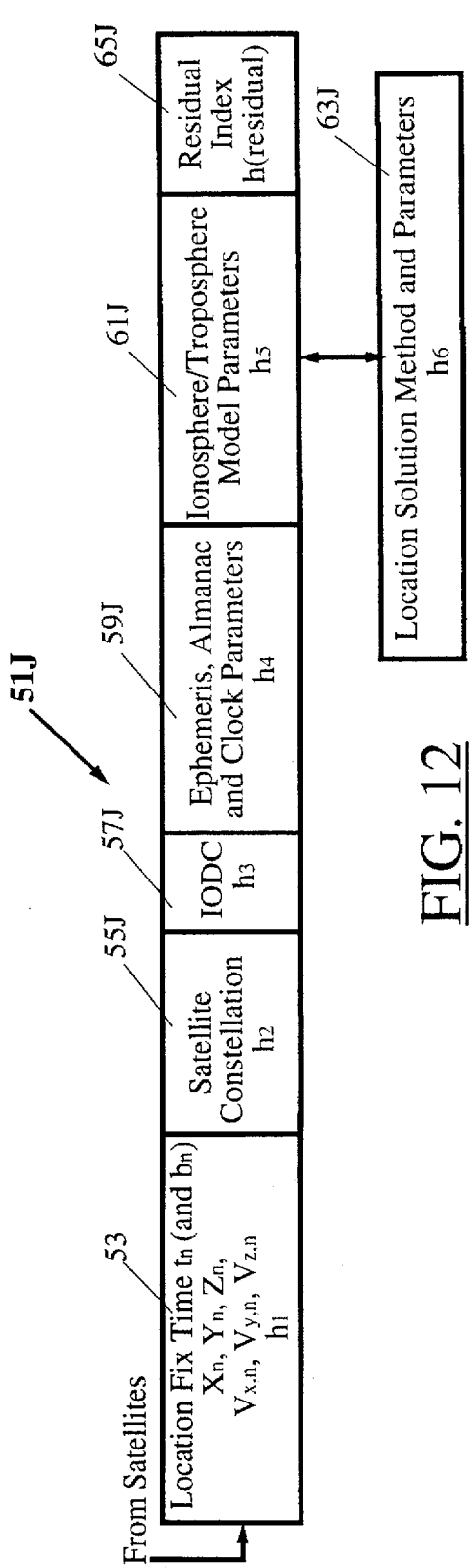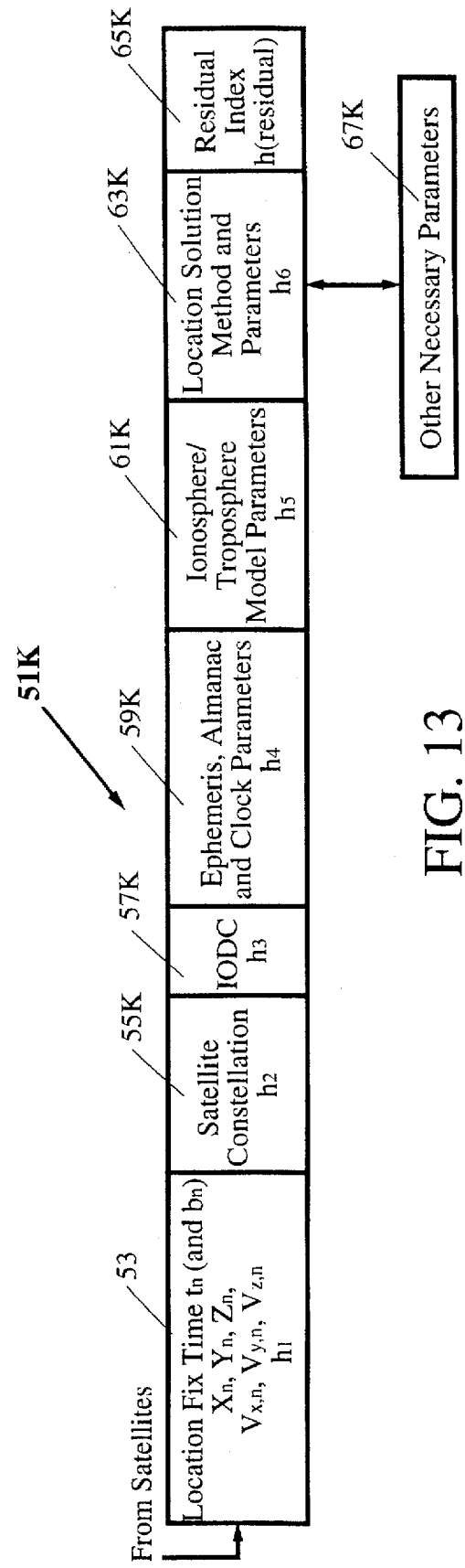

COMPACTION OF SATPS INFORMATION FOR SUBSEQUENT SIGNAL PROCESSING

FIELD OF THE INVENTION

This invention relates to characterization and indexing of information contained in signals received from a Satellite Positioning System (SATPS) signals, such as GPS or GLONASS signals or other similar signals, for subsequent retrieval and processing of this information.

BACKGROUND OF THE INVENTION

Post-processing of GPS signals, whereby signals received are stored in memory until these signals can be analyzed and processed, is an attractive approach, because of the relative freedom in choice of processing methods used and because real time station-to-station communication is not required. However, some types of signal post-processing have been unavailable with conventional approaches to signal storage. Uncorrected pseudorange measurements, made directly from the GPS signals received by a GPS antenna and associated GPS receiver/processor from GPS satellites, can be used to determine the present location of the GPS antenna, using well known methods of solution. However, the antenna location computed by this approach will often have relatively large errors because the pseudorange measurements contain errors due to errors in the receiver/processor clocks and the satellite clocks, signal time delays due to passage through ionosphere and the troposphere, multipath errors, selective availability and other errors.

Pseudorange corrections, computed at a reference station whose spatial location coordinates are very accurately known, can be added to the pseudorange values measured at a mobile GPS station in order to enhance the accuracy of the mobile station coordinates computed from the resulting pseudorange values. Location inaccuracies of tens of meters can be reduced to less than ten meters when pseudorange corrections are included. However, pseudorange corrections must be added directly to the uncorrected pseudorange measurements. This requirement has made it difficult, if not impossible, to include pseudorange corrections in post-processing of GPS signals, using conventional approaches, because of the daunting memory requirements for storage of uncorrected pseudorange measurements.

A system for locating a mobile vehicle that is in distress, disclosed by Zhilin in U.S. Pat. No. 4,240,079, provides an emergency broadcasting radio on the mobile station that is activated and begins to broadcast when the vehicle experiences distress. This broadcast signal is received and retransmitted by a satellite. The retransmitted signal is received by a ground control station that tracks the satellite and determines satellite ephemeris, and by a second ground station that has a communications link with the control station and that helps locate the vehicle in distress.

U.S. Pat. No. 4,294,541, issued to Abler, discloses a bi-periscopic instrument for determining location of a user on the Earth's surface, using two independently adjustable periscopes that capture and superimpose the images of two reference stars. Use of information from this superposition and from an astronomy almanac allows the user to determine its latitude and longitude. In U.S. Pat. Nos. 4,449,817 and 4,462,684, Abler discloses other celestial navigation instruments that rely on almanac data to determine the user's present location.

Savoca, in U.S. Pat. No. 4,827,422, discloses a horizon scanning sensor for a satellite that determines satellite attitude from stored ephemeris data and measurement of the locations of two selected celestial body, such as the sun and the moon.

A device for determining the longitude coordinate of a user of the device is disclosed by Compton in U.S. Pat. No. 4,910,875. Almanac data, measurement of the relative location of a selected celestial body and of the time of measurement are used to determine the user's longitude.

Barnard, in U.S. Pat. No. 5,119,102, discloses a system for receipt and selective storage of GPS signals before retransmission of the full signals. The receiver analyzes the stored data, determines the ephemeris information for each GPS satellite from which the signals are received, and determines the signal propagation times from each satellite, to determine the location of a GPS antenna that feeds the receiver.

In U.S. Pat. No. 5,187,805, Bertiger et al disclose use of a cellular data channel to directly transmit ephemeris information from a GPS satellite to a GPS ground station.

Surveying satellite apparatus is disclosed in U.S. Pat. No. 5,204,818, issued to Landecker et al. On-board sensors measure the relative locations of visible celestial bodies and compare these relative locations with an on-board database to determine whether any satellite ephemeris error or attitude error is present. Satellite ephemeris and attitude are periodically updated based upon these measurements.

A method for selective use of stored ephemeris data received from one or more GPS satellites, before receiver power is turned off, is disclosed by Ando et al in U.S. Pat. No. 5,222,245. If the elapsed time since power turn-off is less than a threshold time, the stored ephemeris data are used to determine user location. If the elapsed time is greater than this threshold time, new ephemeris data are received from the satellite and are used to determine user location.

A database system that uses a plurality of indices to identify a selected section of the database to be searched is disclosed by Amick et al in U.S. Pat. No. 5,251,316. The indices include a time stamp indicating the last time a change was made to an associated lexicon or, less often, the indices themselves were reindexed to reflect changes in the nature of the information objects in the database.

U.S. Pat. No. 5,293,616, issued to Flint, discloses a matrix-based database in which information objects are sought by searching for the simultaneous presence of a plurality of attributes, each associated with a index. Information objects containing one and then another selected attribute are consecutively nested until all attributes are present in the center of the nest. Parallel circuitry is used to increase the rate of retrieval of the desired information objects.

Chang et al, in U.S. Pat. No. 5,319,779, disclose a database system in which information objects to be searched later are initially encoded with indices that indicate the nature of the information that is indexed. An encoded index for an information object may include a plurality of sub-indices, each indicating at least one attribute of that object. Retrieval of information objects may proceed from a lexicon that lists the indices and their corresponding attributes.

A networked differentially corrected GPS in which each reference GPS station in a network receives and analyzes ephemeris and pseudorange information independently is disclosed by Mueller et al, in U.S. Pat. No. 5,323,322. Only information that cannot be obtained or computed by a reference station is transmitted by any other reference station.

These approaches are usually not sufficiently detailed to allow indexing, storage and retrieval of all information needed to reconstruct location and time coordinates, and corrections to these coordinates at a later time, for a mobile user. What is needed is an approach that allows indexing, storage and retrieval, using memory of modest size, of information from which uncorrected pseudorange or other measurements can be regenerated (and corrected, where appropriate) in a post-processing environment, using a Satellite Positioning System (SATPS), such as GPS or GLONASS. Preferably, this approach should allow regeneration of these uncorrected pseudorange measurements from a relatively small group of indicia that fully (or nearly fully) characterize the SATPS signals received at a mobile station antenna from the in-view SATPS satellites.

SUMMARY OF THE INVENTION

These needs are met by the invention, which provides a set of indicia that characterize each pseudorange measurement so that each such measurement can be regenerated from these indicia and a set of intermediate quantities, such as uncorrected spatial location and clock bias coordinates.

The invention provides a method for storing and retrieving data that are equivalent to pseudorange data received by a mobile station from a constellation of GPS satellites by storing and retrieving: (1) a first index h1 specifying the spatial location and clock (bias) coordinates (uncorrected or corrected by DGPS) and the velocity coordinates (optional) of the station at each of a sequence of location fix times $\{t_n\}_n$; (2) a second index h2 representing the constellation of GPS satellites whose signals are used for each of the location fixes; (3) a third index h3 representing the Issue Of Data, Clock (IODC) parameter for each of the location fixes; (4) a fourth index h4 representing the ephemeris, almanac and clock parameters for the satellite constellation for each of the location fixes; (5) a fifth index h5 representing the ionosphere/troposphere model parameters used to model the time delays for signal propagation through the ionosphere and troposphere, from satellite to ground observer, for each of the location fixes; and (6) a sixth index h6 representing the method and method parameters used to determine the location solution $(t,x,y,z,v_x,v_y,v_z)$ for each of the location fixes.

With reference to the sixth index h6, at least three types of location solution methods can be used here: (i) a method that uses only the pseudorange measurements from a "fundamental set" of the four satellites that provide the best GDOP or the highest signal strength or other measure of data quality; (ii) a method that uses the pseudorange measurements from a set of M satellites ($M \geq 5$), weights these measurements appropriately, and uses a least squares or similar approach to determine a location fix solution from this overdetermined set of measurements; and (iii) a method that uses the pseudorange measurements from a set of M satellites and weights these measurements unequally, using weights drawn from a discrete set of such weights in order to produce a sixth index set with a finite number of set elements.

The first, second, third, fourth, fifth and sixth indices together provide a database vector V(h1,h2,h3,h4,h5,h6) that determines how and with what parameter choices each n-tuple of location fix time, spatial location coordinates and velocity coordinates will be processed in order to reproduce the pseudorange and/or carrier phase measurements that were used to generate this n-tuple of coordinates. Each database vector V(h1,h2,h3,h4,h5,h6) allows reproduction of a set of M pseudorange and/or carrier phase measurements, where each such measurement was received from one of the M satellites in the constellation. Each of the six indices hi (i=1, 2, 3, 4, 5, 6) includes one or more parameters that has a range of discrete or continuous values.

BRIEF DESCRIPTION OF THE DRAWINGS

FIGS. 4 and 5 illustrate embodiments in which the satellite constellation parameter or the IODC parameter, respectively, is dynamic.

FIG. 8 illustrates an embodiment in which the ionosphere/troposphere model parameters are dynamic.

FIG. 9 illustrates an embodiment in which the the satellite constellation parameter and the location solution method and parameters are dynamic.

FIG. 10 illustrates an embodiment in which all parameters except the ephemeris, almanac and clock parameters are dynamic.

FIG. 11 illustrates an embodiment in which all parameters except the ionosphere/troposphere model parameters are dynamic.

FIG. 12 illustrates an embodiment in which all parameters except the location solution method and parameters are dynamic.

FIG. 13 illustrates an embodiment in which all parameters are dynamic.

DESCRIPTION OF BEST MODE FOR PRACTICING THE INVENTION

Figure 1:
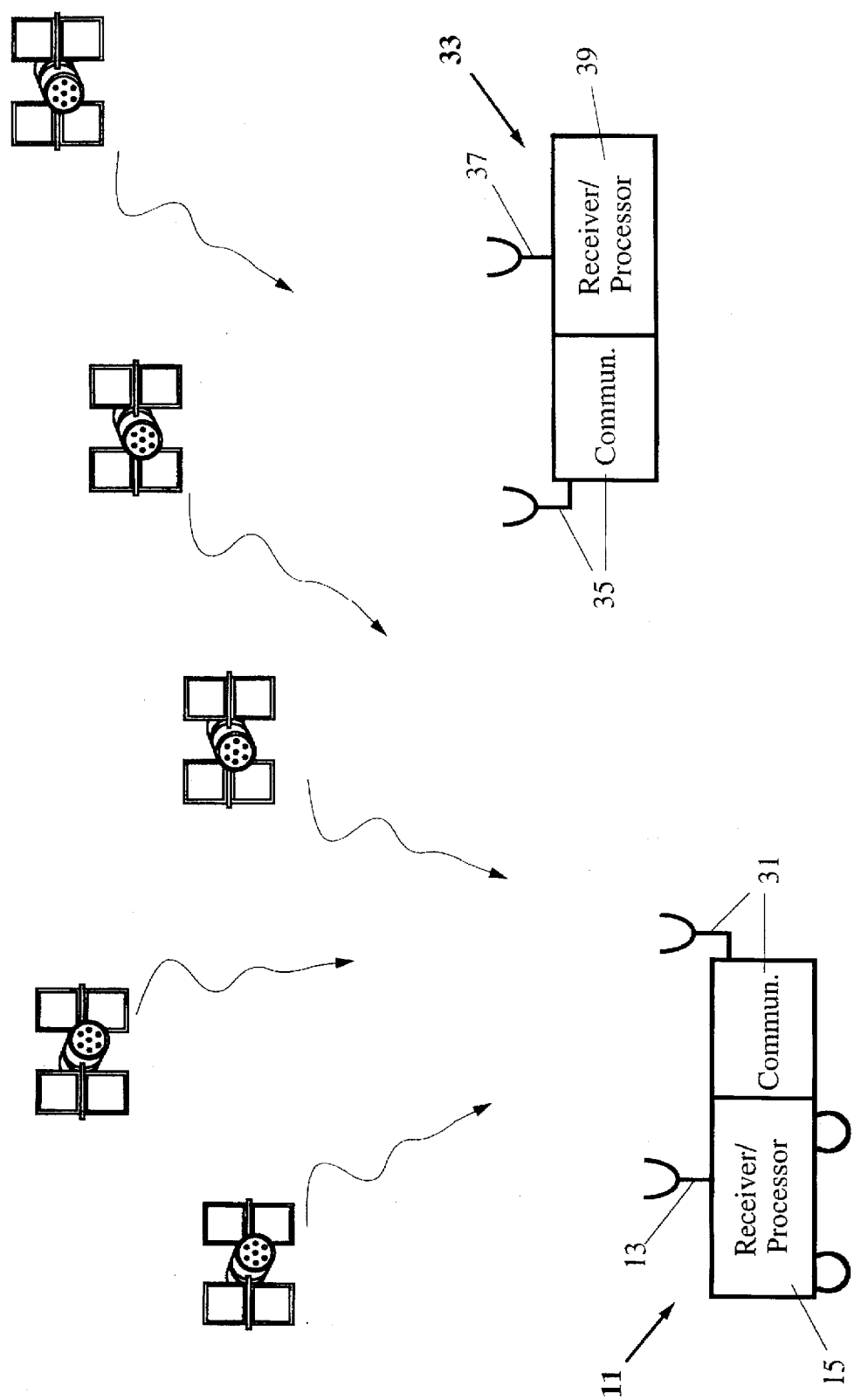
FIG. 1 illustrates an environment in which the invention can be used.

In FIG. 1, a mobile GPS station 11, including a GPS antenna 11 and associated GPS receiver/processor 15 moves with a region R and receives GPS signals from a constellation of GPS satellites 21, 23, 25, 27 and 29. Optionally, the mobile station 11 communicates by radio wave, telephone, cable or other communication means 31 with a central station 33 whose spatial coordinates are known with high accuracy at any time t. The central station 33, with a communications means 35, a GPS antenna 37 and GPS receiver/processor 39, optionally receives GPS signals from its own constellation of GPS satellites. The satellite constellation for the reference station 33 may include all or some of the constellation of satellites from which the mobile station receives its GPS signals. In a first embodiment, the mobile station 11 measures the pseudorange value for each in-view satellite, and determines and stores the present uncorrected spatial location and clock offset coordinates (at most four) for the mobile station $(x_{unc}(t_n), y_{unc}(t_n), z_{unc}(t_n), b_{unc}(t_n))$ for each of a sequence of coordinate fix times $\{t_n\}_n$.

Index h1: Total Coordinate Fixes

Over any selected finite time interval, the set of location fix times $\{t_n\}_n$ within that interval is finite and discrete, and the values $t_n$ may be arranged in order of increasing time values. The index h1 includes the location fix time $t_n$, the spatial location coordinates, $x_n, y_n$ and $z_n$, at that location fix time, and (optionally) the velocity coordinates $v_{x,n}, v_{y,n}$ and $v_{z,n}$, at that location fix time:

$$h1 = (t_n, x_n, y_n, z_n, v_{x,n}, v_{y,n}, v_{z,n}). \quad (1)$$

Optionally, the index h1 may also include the computed clock offset time $b_n$ used to produce the corrected location fix time $t=t_n$.

Index h2: Satellite Constellation

A second index h2 indicates the specific GPS satellites used in the constellation. This index can be constructed in several ways. If P satellites are operational (with P=18–32 under normal circumstances), the second index h2 can be a positive integer SC defined by $$h2 = SC = \sum_{n=0}^{P-1} a_n 2^n, \quad (2)$$

where the coefficient $a_n=1$ if satellite number n+1 is in the constellation and $a_n=0$ otherwise. The sum representing the index h2 ranges over all the non-negative integers from 0 through $2^P-1$ inclusive, and each value of h2 corresponds to a unique constellation. The sum on the right in Eq. (2) can be generalized to the form $$h2 = SC = \left( A \sum_{n=0}^{P-1} a_n w^n + B \right)^c, \quad (3)$$

where A, B and C are non-zero constants and w is a positive number different from 1. The index h2 can be a single number, as indicated in Eq. (3), or can be a sequence of P zeroes and ones that indicate which satellites form part of the present constellation; h2 can also include the integer P.

Any other definition of h2 that provides a 1-to-1 mapping of the collection of all sets having 0, 1, 2, 3, 4, . . . , or P satellites onto a set of distinct numbers is suitable for a definition of h2. These requirements can be relaxed where the number M of satellites in an acceptable GPS constellation varies between M=1 and a maximum number M≦P, such as M=11.

Index h3: IODC Parameter

The Issue Of Data, Clock (IODC) parameter indicates the issue number of the clock correction data set currently used and is defined simply as $$h3 = IODC. \quad (4)$$

If this IODC number changes, at least one parameter in a corresponding clock-related data set has changed. The user is alerted to such change and is given a measure of the age (up to four hours) of this data set since the last change therein. The IODC parameter is specified with ten bits and is discussed further in connection with the fourth index h4. The ephemeris, almanac and clock data parameters that form the basis of the fourth index h4 may change independently of change in the IODC parameter, and conversely, so that the IODC parameter is given a separate index.

Index h4: Ephemeris, Almanac and Clock Data

A fourth index h4 indicates the specific parameter set used to model the ephemerides for the constellation of M satellites and to adjust the clock for a given location fix time $t_n$. The ephemeris and almanac parameters for a given satellite describe a curve fit to the satellite orbit over a time interval whose length τ is variable but averages 2–4 hours. The interval length τ is not critical here; it is sufficient to know that this length satisfies the relation $\tau >> \Delta t_{n+1} = t_{n+1} - t_n$, where $\Delta t_{n+1}$ is the time difference between two consecutive coordinate fixes. The ephemeris and almanac data are discussed at length in the Interface Control Document, ICD-200, Revision B-PR, published 3 Jul. 1991 by Rockwell International Corporation, pages 77–96, and are summarized in Tom Logsdon, *The Navstar Global Positioning System*, Van Nostrand Reinhold, New York, 1992, pages 17–33.

Figure 2:
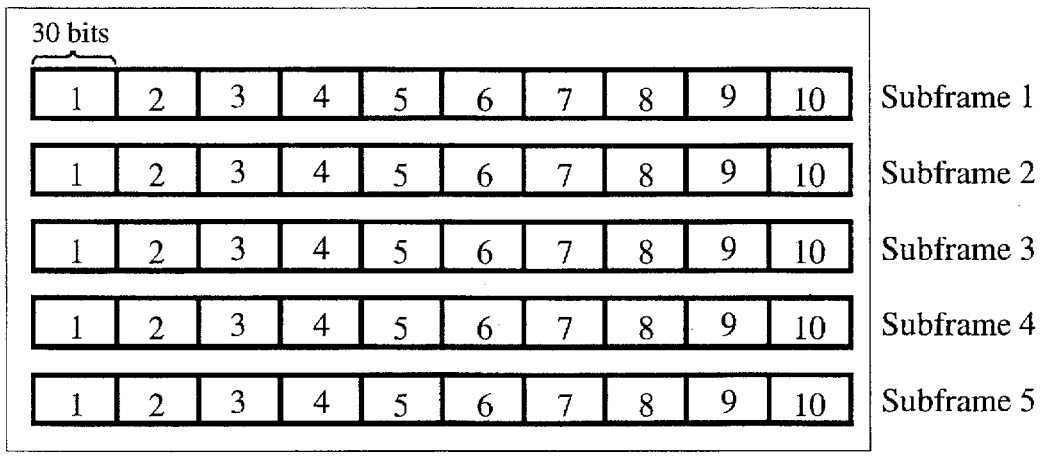
FIG. 2 illustrates the data format contemplated for GPS signals.

GPS data, including ephemeris parameters, ionospheric and tropospheric model parameters, satellite time corrections and other relevant information, are transmitted by each satellite in a digital data stream frame at a rate of 50 bits per second, in five concatenated subframes of 300 bits each over a 30-second time interval. Each subframe contains 10 30-bit words. The current format for GPS data transmission is illustrated in FIG. 2. This format is representative only and does not limit the scope of the invention.

Each data bit is added modulo 2 to the L1 and L2 carrier streams (the PRN code transmitted by that satellite), whose bit rates are in the GHz range, so that a ground receiver receives the L1 and/or L2 carrier signals from a GPS satellite modulated by the GPS data transmitted by that satellite. The first and second words of each subframe are a telemetry (TLM) word and a handover word (HOW), respectively. The remaining eight words in the first subframe contain satellite clock corrections due to at least two relativistic effects: (1) the smaller (by 94 percent) gravitational field in which the satellite moves vis-a-vis a ground receiver and (2) the differences in velocity of the satellite and a ground receiver rotating with the Earth's surface (12,000 and 1,000 feet per second, respectively). Words 3–10 of subframes 2 and 3 contain the ephemeris data for a particular satellite, including 17 parameters that characterize the important features of the ephemeris. This includes characterization of the present orbit of the satellite relative to a geoid that approximates the Earth's surface, the time interval for which this set of ephemeris date is valid (usually about four hours) before these data are replaced by another set that reapproximates the present satellite orbit, and other relevant geometric information. Words 3–10 of the fourth subframe contain navigation messages for the ground receivers. The fourth and fifth subframes are restated 25 times each, with some information therein being changed. These 25 restatements are referred to as 25 "pages" of each of these subframes.

Words 3–10 of the fifth subframe contain almanac data (less detailed than the ephemeris data and covering all GPS satellites) and information on the "health" and status of all the satellites. Information in this portion of the fifth subframe changes through P consecutive frames (P=number of GPS satellites presently operating) and then repeats, with each of these P word groups covering a different satellite. The almanac information is used primarily to determine which satellites are presently above the horizon and are candidates for inclusion in the constellation of M satellites used to determine the present location of a GPS antenna on or near the Earth's surface. Normally, only the clock correction data and ephemeris data, contained in subframes 1, 2 and 3, are used in determining the present location of the GPS antenna.

The clock correction data include the time dilation or deviation experienced by a cesium or rubidium clock in the particular satellite vis-a-vis a (fictitious) similar clock located at the Earth's surface. This clock correction will vary with time because the satellite orbit is not circular but approximately elliptical, with an eccentricity of about 2 percent. By comparison, the Earth's orbit around the sun has an ellipticity of about 1.7 percent. During each approximately 12-hour orbit of a GPS satellite, the deviation of the satellite clock varies by up to about 46 nanoseconds. If this clock rate is not offset by appropriate corrections, a maximum location error of more than 100,000 feet would accumulate over a 24-hour period. By contrast, the maximum error due to orbit eccentricity would be about 100 feet.

The first 8 bits of each TLM word are a preamble, 8 B in hexadecimal format. The next 14 bits contain a TLM message, if any, transmitted MSB first, followed by 2 reserved bits. The last 6 bits of the TLM word are forward error correction (FEC) bits for that word from a Hamming code, CRC or other suitable code. TLM information is not usually included in the fourth index concerning ephemeris, almanac and clock information.

The first 17 bits of the HOW word, transmitted MSB first, are the time of week (TOW) count, based on the X1 epoch (1.5 seconds long) that will begin with the next following subframe. Bits 18 and 19 are special flag bits for presentation of the satellite vehicle (SV) configuration. Bits 20–22 identify the particular subframe (numbered 1, 2, 3, 4 or 5), using an octal format. Bits 25–30 are FEC bits for the HOW word. Bits 23 and 24 are chosen so that bits 29 and 30 in this word are "00". Only the TOW count is included in the information that is part of the fourth index.

Each of the third through tenth words of the first subframe contains FEC bits 25–30, and bits 23–24 of the tenth subframe are reserved for error check purposes. The remaining 190 bits of these words in the first subframe contain clock parameters and other clock data. The clock parameters describe the time interval $\tau$ of validity of the presently transmitted SV information. The first 10 MSBs of word 3 contain the remaining 10 bits of the 29-bit Z-count. The first 17 bits were transmitted in the preceding HOW word. These 10 bits represent the present GPS week at the start of transmission of this data set, with 10 consecutive zeroes representing week number zero. Bits 11 and 12 of word 3 are a parameter, CH(active), indicating whether P-code is active (01) or C/A code is active (10) or some other (unspecified) configuration is present. Other configurations are possible if the U.S. government introduces two new GHz range GPS signal transmission frequencies and thereby creates two new channels, referred to as L3 and L4 herein.

Bits 13–16 of word 3 contain the predicted user range accuracy (URA or SV Accuracy) of the SV information available to the two-frequency (L1 and L2 channels) unauthorized user. The digital value V of these bits ranges from 0 to 15 and has the following meaning: in the range $0 \leq V \leq 6$, the SV location information is accurate to no better than $X=2^{(1+V/2)}$ meters; in the range $7 \leq V \leq 14$, the SV location information is accurate to no better than $X=2^{(V-2)}$ meters; with V=15, the SV location inaccuracy is such that the unauthorized user relies on this information at his/her own risk. For a particular V value, a lookup table is consulted to interpret the URA message.

Bits 17–22 of word 3 of subframe 1 identify the "health" (denoted SVHealth) of the transmitting SV:0 in bit 17 indicates that the transmitted navigation (NAV) data are all satisfactory; 1 in bit 17 indicates that some of the NAV data are bad. Bits 18–22 specify weakness, if any, in the L1 and L2 signals for P code and C/A code, with 00000 indicating that all signals are satisfactory. See Table 20-VIII on page 94 of the ICD-200 document for a detailed explanation of interpretation of these bits. Additional SV health data are contained in subframes 4 and 5.

Bits 23–24 of word 3 contain the 2 MSBs of the 10-bit Issue Of Data, Clock (IODC) information that determines the index h3; bits 1–8 of word 8 in subframe 1 contain the 8 LSBs of this information. The IODC indicates the binary-coded issue number of the data set transmitted, with count 0 beginning with the first transmission of this data set after any corrections are made. The IODC provides the user with a check on the age of these data after the last data correction has been made. The IODC age can be up to 4 hours for Block I satellites and can exceed 4 hours for a satellite in block II, in some situations. The IODC information is, preferably, included as a separate index h3 used in the invention, although h3 can also be expressed as part of the index h4. The ten-bit IODC parameter can be used to specify the ephemeris parameters, if these parameters are restricted to a relatively small set of quantized values. In this situation, the ephemeride information contained in the bits of information specified in subframes 2 and 3. In the more general situation, specification of all ephemeride information in subframes 2 and 3 is required. Bits 25–30 of word 3 are FEC bits.

Bit 1 of word 4 of subframe 1 is a "1" if the NAV data stream has been inactivated by the P-code in the L2 channel. The remaining bits in words 4–6 in subframe 1 are not specified by the ICD-200 document.

Bits 17–24 of word 7 of subframe 1 contain an L1/L2 correction term, TGD (in units of sec), which can be utilized by L1-only or L2-only users. Bits 9–24 of word 8, bits 1–24 of word 9 and bits 1–22 of word 10 are concatenated to provide the clock correction, expressed in time units as small as $2^{-55}$ sec, for the transmitting SV. This information is expressed through four parameters, $t_{oc}$, $a_{f2}$, $a_{f1}$, and $a_{f0}$, included in the fourth index. The SV clock is corrected using the following equation during the 30 second duration of a particular frame:

$$t_{corr} = t_{SV} - \Delta t_{corr}, \quad (5)$$

$$\Delta t_{corr} = [a_{f0} + a_{f1}(t-t_{oc}) + a_{f2}(t-t_{oc})^2 - \Delta t_{rel}], \quad (6)$$

$$\Delta t_{rel} = F e(A)^{1/2} \sin E_k, \quad (7)$$

$$F = -2(\mu)^{1/2}/c^2 = -4.442807633 \times 10^{-10} \text{ sec/(meter)}^{1/2}, \quad (8)$$

$$\mu = 3.96005 \times 10^{14} \text{ (meter)}^3/(sec)^2, \quad (9)$$

$$c = 2.99792458 \times 10^8 \text{ meter/sec}, \quad (10)$$

where the five parameters in Eq. (4) and a in Eq. (7) are further defined below. The control segment of a GPS, as opposed to the user segment that is of concern here, uses the following alternative for the relativistic correction term:

$$\Delta t_{rel} = -2 \underline{r} \cdot \underline{v}/c^2, \quad (11)$$

where r and v are the instantaneous location vector and velocity vector, respectively, of the SV.

The L1/L2 correction term is used only by single frequency GPS users. The expression $\Delta t_{corr}$ used in Eqs. (5) and (6) assumes that the user receives and uses L1 and L2 frequencies. Where only one of these frequencies is used, the SV clock offset estimates must be separately corrected for ionospheric propagation group time delay. Where only a single frequency is used, the expression $\Delta t_{corr}$ in Eq. (3) is replaced by $$\Delta t_{corr} = \Delta t_{SV} - T_{GD} \text{ (L1 only)}, \quad (12)$$

$$\Delta t_{corr} = \Delta t_{SV} - \gamma T_{GD} \text{ (L2 only)}, \quad (13)$$

$$\gamma = (1575.42/1227.60)^2. \quad (14)$$

A two-frequency GPS user corrects the pseudorange for ionospheric time delay effects by estimating the corrected pseudorange $PR_{corr}$ as $$PR_{corr}=[PR(L2)-\gamma PR(L1)]/(1-\gamma), \quad (15)$$

where PR(L1) and PR(L2) are the uncorrected pseudorange values measured using only the L1 channel and only the L2 channel, respectively. As noted above, the U.S. government may introduce additional frequency channels L3 and L4 that will provide additional options and requirements.

Subframe 1 thus contains the following parameters relating to clock correction and scaling of the time $t_{SV}$ for a given curve fit interval $\tau$.

TABLE 1

| Subframe 1 Parameters | | |
|---|---|---|
| Parameter | No. of Bits | LSB Value |
| P and C/A active code on L2 | 2 | 1 |
| Week number (WN) | 10 | 1 |
| L2 P data flag | 1 | 1 |
| SVAccuracy | 4 | |
| SVHealth | 6 | 1 |
| $T_{GD}$ (sec) | 8 | $2^{-31}$ |
| IODC | 10 | |
| $t_{oc}$ (sec) | 16 | 16 |
| $a_{f2}$ (sec$^{-1}$) | 8 | $2^{-55}$ |
| $a_{f1}$ | 16 | $2^{-43}$ |
| $a_{f0}$ (sec) | 22 | $2^{-31}$ |

Subframes 2–5 each also begin with a 30-bit TLM word and a 30-bit handover word. The third through tenth words of subframes 2 and 3 contain ephemeris information and related error check data. Bits 25–30 of each of these words contain FEC error check bits, and bits 23–24 are reserved for non-information bits related to error checks. Bits 18–22 of the tenth word of subframe 2 are spare bits that contain alternating ones and zeroes (1 0 1 0 1 or 0 1 0 1 0) to indicate that the error checks for subframe 2 are validated. The remaining 375 bits in subframes 2 and 3 contain ephemeris data that were applicable at the start of subframe 1 of the present frame.

The ephemeris data include 17 parameters, set forth in Table 2, using Keplerian orbital terminology for most of these parameters. The transmitted parameters are expressed in a form that allows the best trajectory fit in an Earth-fixed coordinate system for a specific curve fit interval, usually about four hours in length. Any intermediate coordinate values generated should not be interpreted with reference to a particular coordinate system. The first and second numbers set forth in parentheses following the definition of each ephemeris parameter are the number of bits used for that parameter and the scale factor (value of MSB), respectively.
Table 2. Ephemeris Parameter Definitions IODE=Issue Of Data, Ephemeris (8 bits; scale factor=1)

$C_{rc}$ (meters)=ampl. of cosine harmonic correc. term to orbit radius (16;$2^{-5}$)

$C_{rs}$ (meters)=ampl. of sine harmonic correc. term to orbit radius (16;$2^{-5}$)

$\Delta n$ (sec$^{-1}$)=mean motion difference from computed value (16;$2^{-43}$)

$M_o$=mean anomaly at reference time (32;$2^{-31}$)

$C_{uc}$ (rad)=ampl. of cosine harmonic correc. term to latitude (16;$2^{-29}$)

$C_{sc}$ (rad)=ampl. of sine harmonic correc. term to latitude (16;$2^{-29}$)

$\epsilon$=orbit eccentricity (32;$2^{-33}$)

$A^{1/2}$ (meters$^{1/2}$)=square root of semi-major axis of orbit (32;$2^{-19}$)

$t_{os}$ (sec)=reference time ephemeris (16;$2^4$)

$C_{ic}$ (rad)=ampl. of cosine harmonic correc. term to inclin. angle (16;$2^{-29}$)

$C_{is}$ (rad)=ampl. of sine harmonic correc. term to inclin. angle (16;$2^{-29}$)

OMEGA$_o$=long. of ascending node of orbit plane at weekly epoch (32;$2^{-31}$)

OMEGADOT (sec$^{-1}$)=rate of change of right ascencion (24;$2^{-43}$)

$i_o$=inclination angle at reference time (32;$2^{-31}$)

IDOT (sec$^{-1}$)=rate of change of inclination angle (14;$2^{-43}$)

$\omega$=angle at perigee (32;$2^{-31}$)

The Issue Of Data, Ephemeride (IODE) parameter is stated in 8 consecutive bits in subframe 2 and in subframe 3, for comparison with each other and for comparison with the 8 LSB bits of the IODC parameter in subframe 1. Whenever these 3 parameters do not agree bit-for-bit, a data set cutover has occurred during the present frame, and new data must be collected. The transmitted 10-bit IODC parameter differs from any IODC parameter issued within the present 7-day week. The transmitted 8-bit IODE parameter differs from the IODE parameter issued during a preceding 6-hour period. Cutover to a new data set occurs only at one-hour boundaries (i.e., at 1:00, 2:00, etc.), except for the first data set of a new upload of ephemeris information. This first data set may be cut in at any time, and thus may be transmitted by the corresponding SV for less than one hour before switchover occurs. Except for this first data set, a cutover to a new data set occurs modulo four hours or modulo six hours, at a one-hour boundary. Cutover from a 4-hour data set to a 6-hour data set, if present, occurs at the end of hour number 6 HN (HN=0,1,2,3,...), measured from the start of the present week. Cutover from a 12-hour data set to a 24-hour data set, if present, occurs modulo 24 hours, measured from the start of the present week. The start of the transmission interval (frame) for each data set correspond to the beginning of the curve fit interval for that data set, and a data set remains valid for the duration of its curve fit interval. The curve fit interval length $\tau$ for Block I SVs is 4 hours. The curve fit interval length $\tau$ for Block II SVs can be 4, 6, 8, 14, 26, 50, 74, 98, 112 or 146 hours, corresponding to the number of days spanned in a 182-day interval. Bit 17 in word 10 in subframe 2 is a flag bit, indicating whether the ephemeris data are based on a 4-hour curve fit interval length (F=0) or on a greater curve fit interval length (F=1).

A figure of merit used to measure the quality of the ephemeris curve fit during a curve fit interval is User Range Error (URE), which is based on the effect of the curve fit error on the user range computed. Where a 4-hour curve fit interval is used, the URE is estimated as 0.35M for a 1-sigma statistical error. Truncation of the ephemeris parameters increases this 1-sigma error to 0.4M. These URE data apply during the 4-hour curve fit interval and for 3 hours thereafter. Where a 6-hour curve fit interval is used, the URE is estimated as 1.5M for a 1-sigma error, and ephemeris parameter truncation increases this URE to 1.6M. These URE data apply during the 6-hour curve fit interval and for 2 hours thereafter. The URE is not presently transmitted by an SV.

Table 3 sets forth 22 constants and parameters used in a WGS-84 Earth-centered, Earth-fixed (ECEF) coordinate system. In this coordinate system, the origin is located at the Earth's center of mass, with the z-axis parallel to the direction of the Conventional International Origin for polar motion. The x-axis direction is the intersection of the WGS-84 reference meridian plane and the plane of the mean astronomic equator, where the reference meridian is parallel to the zero meridian defined by the Bureau International de L'Heure. The y-axis is the vector direction given by $u_z \cdot u_x$, where $u_z$ and $u_x$ are unit vectors parallel to the +z-axis and +x-axis, respectively. A user will take account of the effect of the Earth's rotation on time delay for signal propagation from an SV to the user's antenna.

Table 3. WGS-84 Parameters and Definitions.

$\Omega_e = 7.2921151467 \times 10^{-5}$ rad/sec (Earth rotation rate),
A (semi-major axis of an ellipse),
$n_0 = [=/A^3]^{1/2}$ (computed mean SV motion in rad/sec),
$n = n_0 + \Delta n$ (corrected mean SV motion in rad/sec),
$t_k = t - t_{oe}$ (time from ephemeris reference epoch),
$M_k = M_0 + n\, t_k$ (mean anomaly in SV motion),
$M_k = E_k - e \sin E_k$ (Kepler's equation for eccentric anomaly in radians),
$v_k = \tan^{-1}\{[1-e^2]^{1/2} \sin E_k/(1-e \cos E_k)\}$ (true anomaly),
$E_k = \cos^{-1}[(e+\cos v_k)/(1+e \cos v_k)]$ (eccentric anomaly),
$\Phi_k = v_k + \omega$ (argument of latitude),
$\delta u_k = C_{us} \sin 2\Phi_k + C_{rs} \cos 2\Phi_k$ (argument of latitude correction),
$\delta r_k = C_{rc} \cos 2\Phi_k + C_{rs} \sin 2\Phi_k$ (radius correction),
$\delta i_k = C_{ic} \cos 2\Phi_k + C_{is} \sin 2\Phi_k$ (correction to inclination),
$u_k = \Phi_k + \delta u_k$ (corrected latitude argument),
$r_k = A(1-e \cos E_k) + \delta r_k$ (corrected radius),
$i_k = i_0 + \delta i_k + (IDOT)\, t_k$ (corrected inclination),
$x_k' = r_k \cos u_k$ (x-position in orbital plane),
$y_k' = r_k \sin u_k$ (y-position in orbital plane),
$\Omega_k = \Omega_0 + (\Omega - \Omega_e)\, t_k - \Omega_e\, t_{oe}$ (corrected longitude of ascending mode),
$x_k = x_k' \cos \Omega_k - y_k' \cos i_k \sin \Omega_k$ (Earth-fixed coordinates),
$y_k = x_k' \sin \Omega_k + y_k' \cos i_k \cos \Omega_k$,
$z_k = y_k' \sin i_k$.

The sensitivity of an SV antenna's phase center location to small perturbations is very high. For example, this sensitivity is about 1 meter per meter for the parameters $A^{1/2}$, $C_{rc}$ and $C_{sc}$. Because of this sensitivity, the value of $\pi$ is given to at least 14 decimal places, viz.

$$\pi = 3.1415926535898. \qquad (16)$$

Subframes 4 and 5 each have 25 versions that are transmitted in consecutive frames as "pages". Identification of the SV number is contained in bits 3–8 of word 3 of each page of subframe 4. The SV ID nos. are utilized in two ways: (1) for pages that contain the almanac data for a given SV, the SV ID no. is equal to the PRN code no. assigned to that SV; (2) for all other pages, the SV ID no. indicates the transmission data structure for that SVC. The ID no. "0" is assigned to a fictitious SV. ID nos. 1–32 are assigned to pages that contain almanac and health data for a specified SV (pages 2–5 and 7–10 of subframe 4 plus pages 1–24 of subframe 5). The almanac data are a reduced precision subset of the clock correction and ephemeris parameters for SVs. These data occupy bits 3–10 of all pages, except bits 1–8 of word 3 (data and SV ID nos.), bits 17–24 of word 5 (SV health), and the 50 bits devoted to error checks. Table 4 exhibits the ten almanac parameters, and associated precision and scale factors for these parameters.

TABLE 4

Almanac Data

| Parameters | No. of Bits | Scale Factor $2^E$ |
|---|---|---|
| e | 16 | E = −21 |
| $t_{oe}$ (sec) | 08 | 12 |
| δi (semicircles) | 16 | −19 |
| OMEGADOT (semicircles/sec) | 16 | −38 |
| $(A)^{1/2}$ (meters$^{1/2}$) | 24 | −11 |
| OMEGA (semicircles) | 24 | −23 |

TABLE 4-continued

Almanac Data

| Parameters | No. of Bits | Scale Factor $2^E$ |
|---|---|---|
| ω (semicircles) | 24 | −23 |
| MO (semicircles) | 24 | −23 |
| $a_{f0}$ (sec) | 11 | −20 |
| $a_{f1}$ | 11 | −38 |

Subframes 4 and 5 contain two kinds of SV health data: (1) each an 8-bit health status word in each of the 32 (or fewer) pages that contain almanac data for an SV; and (2) 6-bit health status data for all SVs, contained in page 25 of subframes 4 and 5. The three MSBs of each 8-bit health term indicate SV health as set forth in Table 5.

TABLE 5

NAV Data Health Indicia

| Bit 137 | 138 | 139 | Indication |
|---|---|---|---|
| 0 | 0 | 0 | All data satisfactory |
| 0 | 0 | 1 | Parity check failure |
| 0 | 1 | 0 | TLM/HOW format problem |
| 0 | 1 | 1 | Z-count is invalid |
| 1 | 0 | 0 | Word(s) 3–10 in subframes 1, 2 or 3 is bad |
| 1 | 0 | 1 | Word(s) 3–10 in subframes 4 or 5 is bad |
| 1 | 1 | 0 | All uploaded data are bad |
| 1 | 1 | 1 | TLM and/or HOW and another word are bad |

Subframe 4, page 25, contains a 4-bit term for each SV indicating the anti-spoof (AS) status and the configuration code for each SV. These 4-bit terms occupy bit positions 9–24 of word 3, bits 1–24 of words 4–7 and bits 1–16 in word 8, in subframe 5, page 25. The first (MSB) bit of such a term is "1" if AS is on and is "0" if AS is off. The remaining three bits of such term have the values and interpretations set forth in Table 6.

TABLE 6

SV Configurations

| Code | SV Configuration |
|---|---|
| 0 0 0 | Block I SVs |
| 0 0 1 | Block II SVs |

Universal Coordinated Time ("UTC") is coordinated with GPS time through use of eight parameters set forth in Table 7. This information is found subframe 4, page 18, bits 7–30 of words 6–9 plus bits 23–30 of word 10.

TABLE 7

UTC Parameters

| Parameter | No. of Bits | Scale Factor $2^E$ |
|---|---|---|
| AO (sec) | 32 | E = −30 |
| A1 | 24 | −50 |
| $\Delta t_{LS}$ (sec) | 08 | 1 |
| $t_{ot}$ (sec) | 08 | 12 |
| $WN_t$ (weeks) | 08 | 1 |
| $WN_{LSF}$ (weeks) | 08 | 1 |
| DN (days) | 08 | 1 |
| $\Delta t_{LSF}$ (sec) | 08 | 1 |

Page 18 of subframe 4 (words 3–10) contains ionospheric and UTC data that are of concern in the indexing of the pseudorange data that are measured and stored here. Page 25 of subframe 5 contains SV health data for all SVs, plus the almanac reference time and almanac reference week number. No other page of subframe 4 or subframe 5 contains any data that are of concern in this indexing.

The index h4 is an ordered concatenation of part or all of the following ephemeris, almanac and clock correction parameters. No particular parameter ordering is required.

h4 = (IODC, WN, L2/P, SVAccuracy, SVHealth, $T_{GD}$(sec), (17)
$t_{oc}$(sec), $a_{f2}$(sec$^{-1}$), $a_{f1}$, $a_{f0}$(sec), IODE, $C_{rc}$(meters),
$C_{rs}$(meters), $C_{sc}$(meters), $\Delta n$(sec$^{-1}$), $M_o$, $C_{uc}$(rad), e,
$A^{1/2}$(meters$^{1/2}$), $t_{os}$(sec), $C_{ic}$(rad), $C_{is}$(rad), OMEGA$_o$,
OMEGADOT(sec$^{-1}$), $i_o$, $\omega$, $t_{oe}$(sec), e, $\Phi_k$, $\delta u_k$, IDOT,
$C_{us}$(rad), $C_{rs}$(rad), $\delta 1$, SVConfig, A0(sec), A1, $\Delta t_{LS}$(sec),
$\Delta t_{LSF}$(sec), $t_{ot}$(sec), WN$_t$, WN$_{LSF}$, DN, HN, $\tau$, $t_{SV}$, CH).

SVHealth includes an 8-bit health status segment in each of the 32 (or fewer) pages with SV almanac data and a 6-bit health status segment for all SVs, contained in subframes 4 and 5, page 25.

The almanac contains a subset of the clock and ephemeris data, with reduced precision. The ephemeris algorithms applied to the subframe 1, 2 and 3 data are also applied to the almanac data. The sensitivity of the almanac data to small perturbations is greater than the sensitivity of the ephemeris data to the same small perturbations, because of the reduced precision of the almanac data. The almanac reference time $t_{oa}$ is nominally stated in multiples of 212 seconds (approximately 1.13778 hours), truncated from a time 3.5 days after the first valid transmission time for the almanac data set. The almanac data are updated often enough so that the GPS time differs from $t_{oa}$ by less than 3.5 days during a transmission interval. This normally applies for normal and "short-term" operations.

For "long-term" operations, where the user seeks to extend the almanac use time beyond the allocated time span for use of the almanac, the almanac reference time $t_{oa}$ is referenced to the almanac reference week WN$_s$; and $t_{oa}$ and WN$_s$ are contained in subframe 5, page 25, word 3.

The almanac time parameters consist of two 11-bit constants, $a_{f0}$ and $a_{f1}$, that appear in an equation relating an SV PRN code phase offset $\Delta t_{SV}$ to the GPS system time $t_{GPS}$, in the form $$\Delta t_{SV} = a_{f0} + a_{f1} t_{GPS},\qquad(18)$$

where the true time t is related to the SV-provided time $t_{SV}$ at message transmission time by the relation $$t = t_{SV} - \Delta t_{SV}.\qquad(19)$$

Because the periodic relativistic effect on measured distance in GPS is less than 25 meters, this correction is not included in the time scale for almanac evaluation. Over the time span of almanac data applicability, the almanac time parameters are expected to provide a statistical URE of less than 135 meters (1 sigma).

Subframe 4, page 18, contains the parameters relating GPS time to UTC and the week number WN$_{LSF}$ and day number DN at which the leap second $\Delta t_{LS}$ (required to correct the present time for agreement with GPS time) is added. "Day one" refers to the first day that begins after the start of a week, and WN$_{LSF}$ consists of the 8 LSBs of the full week number. The difference between the untruncated number WN and the truncated number WN$_{LSF}$ should not exceed 127. Three different relations exist between GPS time and UTC.

(1) When the time indicated by the WN$_{LSF}$ and DN values is not in the past (relative to the user's present time), and the user's present time does not lie in the time span DN+3/4 ≤ t ≤ DN+5/4, the UTC-GPS time relationship is $$t_{UTC} = t_{GPS,est} - \Delta t_{UTC} \text{ (modulo 86400 sec)},\qquad(20)$$

$t_{GPS,est}$ = GPS time estimated by the user based on correcting $t_{SV}$ and for ionospheric time delays and selective availability dither, (21)

$$\Delta t_{UTC} = \Delta t_{LS} + A_0 + A_1(t_{GPS,est} - t_{ot} + 604800(WN - WN_t)),\qquad(22)$$

$A_0$, $A_1$ = zeroth and first order coefficients for polynomial, (23)

$t_{ot}$ = reference time for UTC data, (24)

WN = current week number, (25)

WN$_t$ = UTC reference week number. (26)

(2) When the user's present time t falls in the time span DN+3/4 ≤ t ≤ DN+5/4, the leap second event is accommodated by the relation $$t_{UTC}(sec) = W \text{ (modulo } [86400 + \Delta t_{LSF} - \Delta t_{LS}]),\qquad(27)$$

$$W = \Delta t_{GPS,est} - \Delta t_{UTC} - 43200) \text{ (modulo } 86400) + 43200.\qquad(28)$$

Whenever a leap second is added, the user equipment must consistently implement arithmetic borrow and carry operations into the counts for any year, week or day.

(3) When the user's present time does not lie in the past, the UTC-GPS time relationship is $$t_{UTC} = t_{GPS,est} - \Delta t_{UTC} \text{ (modulo 86400 sec)},\qquad(29)$$

$$\Delta t_{UTC} = \Delta t_{LSF} + A_0 + A_1(t_{GPS,est} - t_{ot} + 604800(WN - WN_t)).\qquad(30)$$

Index h5: Modelling of Atmospheric Effects

Eight ionospheric parameters, set forth in Table 8, allow the single frequency user (L1 channel only or L2 channel only) to specify an ionospheric model to be used to estimate time delay for signal propagation through the ionosphere, relative to propagation over the same distance in a vacuum. These parameters are found in subframe 4, page 18, bits 9–24 of word three plus bits 6–30 of words 4 and 5.

TABLE 8

Ionospheric Parameters

| Parameter | No. of Bits | Scale factor 10$^E$ |
| --- | --- | --- |
| $\alpha_0$ (sec) | 8 | E = −30 |
| $\alpha_1$ (sec/semicircle) | 8 | −27 |
| $\alpha_2$ (sec/semicircle) | 8 | −24 |
| $\alpha_3$ (sec/semicircle) | 8 | −24 |
| $\beta_0$ (sec) | 8 | +11 |
| $\beta_1$ (sec/semicircle) | 8 | +14 |
| $\beta_2$ (sec/semicircle) | 8 | +16 |
| $\beta_3$ (sec/semicircle) | 8 | +16 |

Use of a two-frequency ionospheric time delay model (e.g., using the L1 and L2 frequencies) to correct the measured time for receipt of signals from an SV relies on the estimate of time delay given by $$\Delta t = a + b/f^2,\qquad(31)$$

where a and b are constants and f is the frequency of the signal component whose time delay for propagation through the ionosphere is being determined. Use of this two-frequency model is expected to reduce the rms error due to propagation through the ionospheric by at least 50 percent.

The ionospheric time delay correction model is given by $$\Delta t(L1;iono) = F\{5 \times 10^{-9} + AMP[1 - x^2/2 + x^4/24]\}(|x| < 1.57)$$
$$= F\{5 \times 10^{-9}\} \ (|x| \geq 1.57), \quad (33)$$

$$\Delta t(L2;iono) = \gamma \Delta t(L1;iono), \quad (34)$$

where $$F = 1 + 16(0.53 - E)^3 \ \text{(obliqueness factor)}, \quad (35)$$

$E$ = elevation angle between user and SV, (36)

$$AMP = \text{Max}\left[0, \sum_{n=0}^{3} \alpha_n(\phi_m)^n\right], \quad (37)$$

$x = 2\pi(t - 50400)/PER$ (phase in radians), (38)

$$PER = \text{Max}\left[0, \sum_{n=0}^{3} \beta_n(\phi_m)^n\right]. \quad (39)$$

Here, $\alpha_n$ are the coefficients of a cubic equation, representing vertical delay; and $\beta_n$ are the coefficients of a second cubic equation representing the period of the model, transmitted as data words (8 bits per coefficient) by an SV.

The variables $\phi_m$ are found as solutions of the equations $\phi_m = \phi_i + 0.64 \cos(\lambda_i - 1.617)$ (geomagnetic latitude of projection on Earth of ionospheric intersection point), (40)

$\lambda_i = \lambda_u + (\psi \sin A/\cos\phi_i)$ (geodetic longitude of projection on Earth of ionospheric intersection point), (41)

$\phi_i = \phi_u + \psi\cos A \ (|\phi_i| \leq 0.416)$ (42)
$= +0.416 \ (\phi_i \geq 0.416)$
$= -0.416 \ (\phi_i < -0.416)$ (geodetic latitude of projection on Earth of ionospheric intersection point), $\psi = 0.0137/(E + 0.11) \ 0.22$ (central angle between vectors to user and to ionospheric intersection point), (43)

$A$ = azimuthal angle between user and SV, measured positive from true north (44)

$\phi_u$ = user geodetic latitude (from WGS-84), (45)

$\lambda_u$ = user geodetic longitude (from WGS-84), (46)

local time = $t - [t - 86400]_{int}$ (fractional part of $t - 86400$). (47)

The fifth index h5 is an ordered concatenation or parameters, including the eight ionosphere model parameters set forth in Table 8, any troposphere model parameters ($MP_{tropo}$) used, the almanac reference time and reference week, the two almanac time parameters, the two parameters $A_0$ and $A_1$ used in the UTC-GPS time relationship, the two parameters a and b and applicable frequency f used in a two-frequency model for time delay, the user-SV elevation angle E, the user-SV azimuthal angle A, the parameter $\phi_m$ used in the ionospheric model, the UTC reference time $t_{ot}$, the day number, the current week number, the truncated week number, the UTC reference week number, and the user geodetic latitude $\phi_u$ and geodetic longitude $\lambda_u$. No particular parameter ordering is required.

$$h5 = (\alpha_0, \alpha_1, \alpha_2, \alpha_3, \beta_0, \beta_1, \beta_2, \beta_3, MP_{tropo}, t_{oa}, WN_8, a_{f0}(sec), \quad (48)$$

-continued
$a_{f1}, A_0(sec), A_1, a, b, f(sec^{-1}), E, A, \phi_m, t_{ot}(sec), DN, WN,$
$WN_{LSF}, WN_t, \phi_u, \lambda_u)$.

Any or all of the quantities $a_{f0}(sec), a_{f1}, A_0(sec), A_1$, DN and WN, among others, which are also part of the index h4, can be optionally deleted in the index h3 or in the index h4, if a minimal set of parameters is desired.

Index h6: Location Solution Method and Parameters

The pseudorange and/or carrier phase measurements are preferably received from each of four or more satellites or ground-based radiowave sources at a location whose spatial coordinates (x,y,z) are unknown, at a time coordinate value t with a clock correction $\Delta t$ that is also unknown as yet. The pseudorange values PR(t;k) for the four sources are related to the unknown coordinates (t,x,y,z) by the following equations.

$$[(x-x1)^2 + (y-y1)^2 + (z-z1)^2]^{1/2} + c\Delta t = PR(t;1) \quad (49)$$

$$[(x-x2)^2 + (y-y2)^2 + (z-z2)^2]^{1/2} + c\Delta t = PR(t;2) \quad (50)$$

$$[(x-x3)^2 + (y-y3)^2 + (z-z3)^2]^{1/2} + c\Delta t = PR(t;3) \quad (51)$$

$$[(x-x4)^2 + (y-y4)^2 + (z-z4)^2]^{1/2} + c\Delta t = PR(t;4) \quad (52)$$

where $(x_k, y_k, z_k)$ are the known spatial coordinates of the kth satellite at the time t and c is a representative speed of light. Corrections to the pseudorange values PR(t;k), if available, may have been made at this point or may have been deferred to a later time. It is assumed initially that K=4 pseudorange values PR(t;k) from different satellites are provided here. Many methods are available to obtain the unknown spatial coordinates (x,y,z) and the unknown temporal coordinate t from the four available pseudorange values. Each of these Q1 methods is assigned an index ($M_i$; $\pi_i$) (i=1, 2, ..., Q1), where a first sub-index $M_i$ identifies the particular method used to invert Eqs. (49)–(52) and a second sub-index $\pi_i$ identifies a particular parameter set used with the method whose referent sub-index is $M_i$. The sub-index $\pi_i$ may be different and have a different size for each distinct method.

No matter which method is used to invert the relations (49)–(52), substitution of the solution coordinate set (t,x,y,z) therein should closely or exactly satisfy these relations. Knowledge of the total solution set (t,x,y,z) allows the user to recover (nearly) precisely the pseudorange values PR(t;k) for k=1, 2, 3, 4. In this situation, the sixth index is expressed as $$h6' = (K, Q0/Q1, M_i; \pi_i; t_n, x_n, y_n, z_n) \ (i=1, \ldots, Q1), \quad (53)$$

where K=4 here and Q0=0. The total solution coordinate values $(t_n, x_n, y_n, z_n)$ may be redundant here and may be deleted in the index h6 if desired. The optional velocity coordinates $(v_{x,n}, v_{y,n}, v_{z,n})$ may be included as part of the index h6, if needed.

If K<4 (say, K=1, 2 or 3), K–4 coordinates in the total coordinate set (t,x,y,z) are already known. For example, if the temporal coordinate t is already known, through provision of a precise (atomic) clock at the receiving station, then K≤3 and receipt of pseudorange signals from 3 satellites will suffice to determine a total solution set (t$\Delta$t,x,y,z). Again, each of the Q2 methods that is available to determine the total solution set is assigned an index ($M_i$; $\pi_i$) (i=Q1+1, ..., Q1+Q2), and the sixth index in this situation is expressed as $$h6' = (K, Q1/Q2, M_i; \pi_i; t_n, x_n, y_n, z_n) \ (i=Q1+1, \ldots, Q2), \quad (54)$$

where K<4 here.

If $K>4$ ($K \geq 5$), the system of K equations for the unknowns $t_n$, $x_n$, $y_n$, and $z_n$ is overdetermined, and an optimizing method is often used for determination of the "best" total solution coordinates $(t_n, x_n, y_n, z_n)$. One representative approach uses a "least mean squares" or "least pth power" solution in which a pth power (usually, with p=2) of the length of a selected component vector, weighted using a metric of statistical variances, is minimized to determine the total location solution coordinates $(t_n, x_n, y_n, z_n)$. Other methods of solution for an overdetermined system of equations can also be used here. Each such method $M_i$ ($i=Q2+1, \ldots, Q3$) has an associated method parameter set $\pi_i$, and the sixth index h6 is expressed as $$h6'=(K, Q1/Q2, M_i; \pi_i; t_n, x_n, y_n, z_n) \ (i=Q2+1, \ldots, Q3). \quad (55)$$

It is assumed here that from any method $M_i$ used to determine the total location solution coordinates $(t_n, x_n, y_n, z_n)$ can be inverted to provide the corresponding pseudoranges and/or carrier phases with acceptable accuracy. The general expression for the index h6 becomes $$h6=(K, M_i; \pi_i; t_n, x_n, y_n, z_n) \ (i=1, 2 \ldots, \text{or } Q3). \quad (56)$$

The set of parameters set forth above in each of the indices h1, h2, h3, h4, h5 and h6 is complete for most purposes, but not all of the parameters set forth for each index need be included corresponding to each total coordinate set (t,x,y,z). In some situations, it may be appropriate to include less than all of the parameters in one or more of the indices h1, h2, h3, h4, h5 and/or h6. In other situations, inclusion of additional parameters in one or more of the indices h1, h2, h3, h4, h5 and/or h6 may be appropriate. Most of these parameters will change from one location fix time to the next and must be included with each new total index (h1,h2,h3,h4,h5,h6). Some of these parameters, such as WN and DN, will remain the same over a substantial time interval and may need to be specified only when that parameter changes. This can be used to reduce the size of the total index captured and stored for later retrieval, post-processing and (optionally), correction of pseudorange and/or carrier phase signals. For the indices h4 and h5, a subset of all, or less than all, of the parameters shown in Eqs. (17) and (48) can be used here.

Implementation

Figure 3:
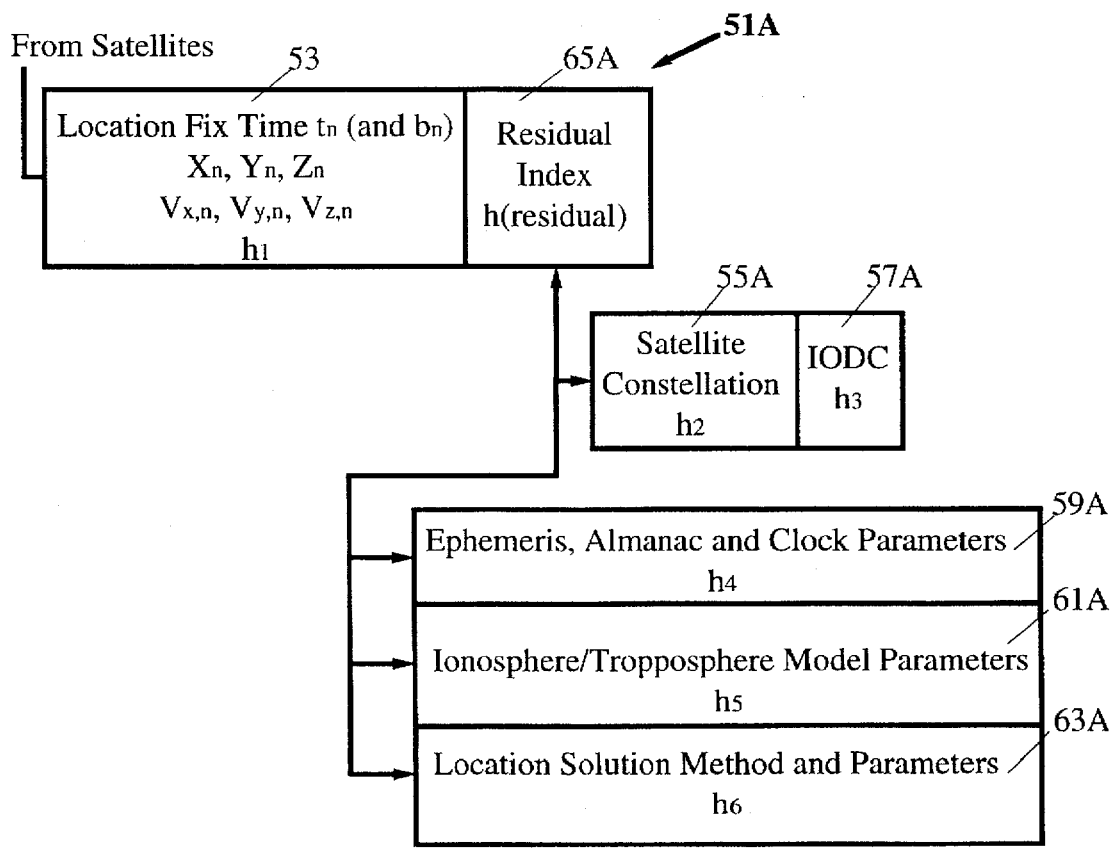
FIG. 3 illustrates an embodiment in which information on two groups of parameters, specified by a total coordinate index, is dynamic, and can change with each new location fix time; in which the satellite constellation and the IODC parameters, specified by two indices, is semi-dynamic and can change infrequently with time; and in which three other groups of parameters, specified by three additional indices, are fixed and contained in a memory that is accessible to a station that performs post-processing computations on the received and stored data.

The invention can be implemented at several different levels. FIG. 3 illustrates a first approach, where: (1) the "location fix time data" $(t_n, x_n, y_n, z_n, v_{x,n}, v_{y,n}, v_{z,n})$ that form the first index h1 are "dynamic", can change with each new location fix time $t_n$, and are stored in an allocated region 53 of a memory; (2) the satellite constellation index h2 and the IODC index h3 are "semi-dynamic" (or static) and do change, but less often than the location fix time $t_n$ (e.g., may be unchanged over a time interval of length ranging from several seconds to several hours), and are stored in allocated regions 55A and 57A of the memory; and (3) the ephemeris, almanac and clock parameters (index h4), the ionosphere/troposphere model parameters (index h5), and the location solution method and parameters used in the total coordinate solution (index h6) are static, are unchanging over time intervals of length from several hours to several weeks, and are stored permanently in the respective regions 59A, 61A and 63A in the memory. The memory may be located at a mobile GPS station that receives the GPS signals directly from the satellites, at a GPS central signal processing station, or at a combination of a mobile GPS station and a GPS central processing station.

In this first or highest level approach, an information tag 51A is provided that includes the first index h1, which is always dynamic. The tag 51A also includes a residual index, contained in an allocated region 65A of the memory and denoted h(residual), that specifies and refers to the remaining indices (h2, h3, h4, h5 and h6 in FIG. 3) and the information contained in these indices.

In any of the approaches discussed here, the IODC and IODE parameters, specifying the age of the present clock parameters and ephemeris parameters, may be included in the index h3. The IODC and IODE parameters refer to information that is contained in or referred to primarily in the index h4.

In a second approach, illustrated in FIG. 4: (1) the index h1 and the index h2 that specifies the satellite constellation is dynamic and is contained in an allocated region 55B of memory; (2) the index h3 is semi-dynamic (or static) and is contained in an allocated region 57B of memory; and (3) the indices h4, h5 and h6 are static and are contained in allocated regions 59B, 61B and 63B of memory. An information tag 51B contains the indices h1 and h2 and contains a residual index in an allocated region 65B of memory, that refers to the remaining indices.

In a third approach, illustrated in FIG. 5: (1) the index h3 that specifies the IODC parameter is dynamic and contained in an allocated region 57C of memory; (2) the index h2 is semi-dynamic (or static) and is contained in an allocated region 55C of memory; and (3) the indices h4, h5 and h6 are static and are contained in allocated regions 59C, 61C and 63C of memory. An information tag 51C contains the indices h1 and h3 and contains a residual index in an allocated region 65C of memory, that refers to the remaining indices.

Figure 6:
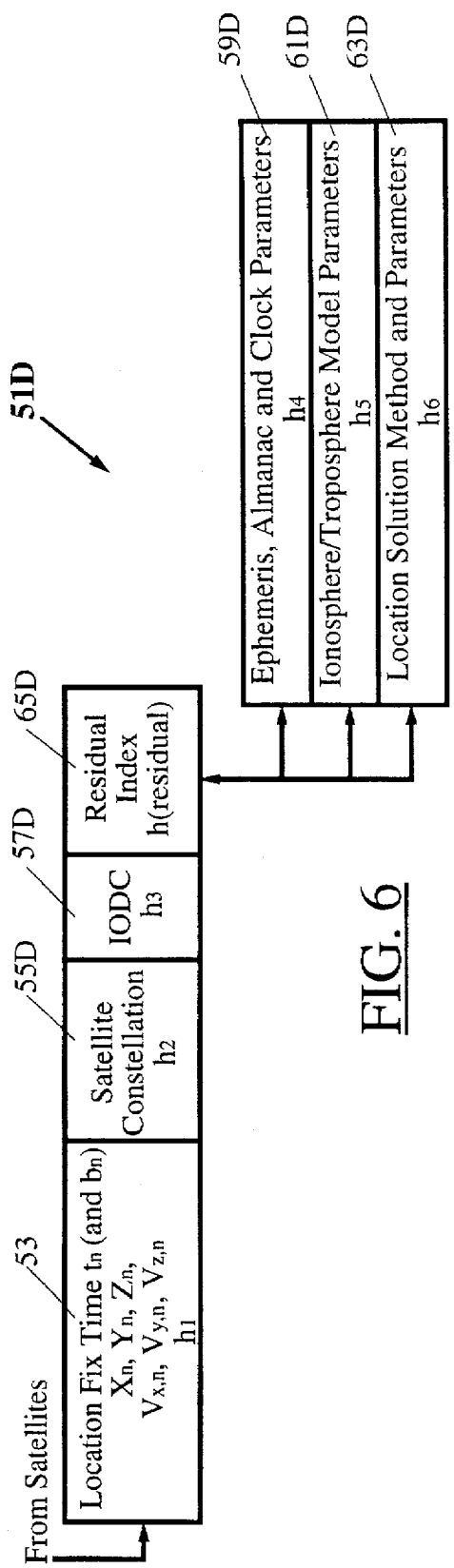
FIG. 6 illustrates an embodiment in which the the satellite constellation and IODC parameters are both dynamic.

In a fourth approach, illustrated in FIG. 6: (1) the index h1 and the indices h2 and h3 that specify the satellite constellation and the IODC parameter are dynamic and contained in allocated regions 55D and 57D of memory; (2) the indices h4, h5 and h6 are semi-dynamic or static and are contained in allocated regions 59D, 61D and 63D of memory. An information tag 51B contains the indices h1, h2 and h3 and contains a residual index in an allocated region 65D of memory, that refers to the remaining indices.

Figure 7:
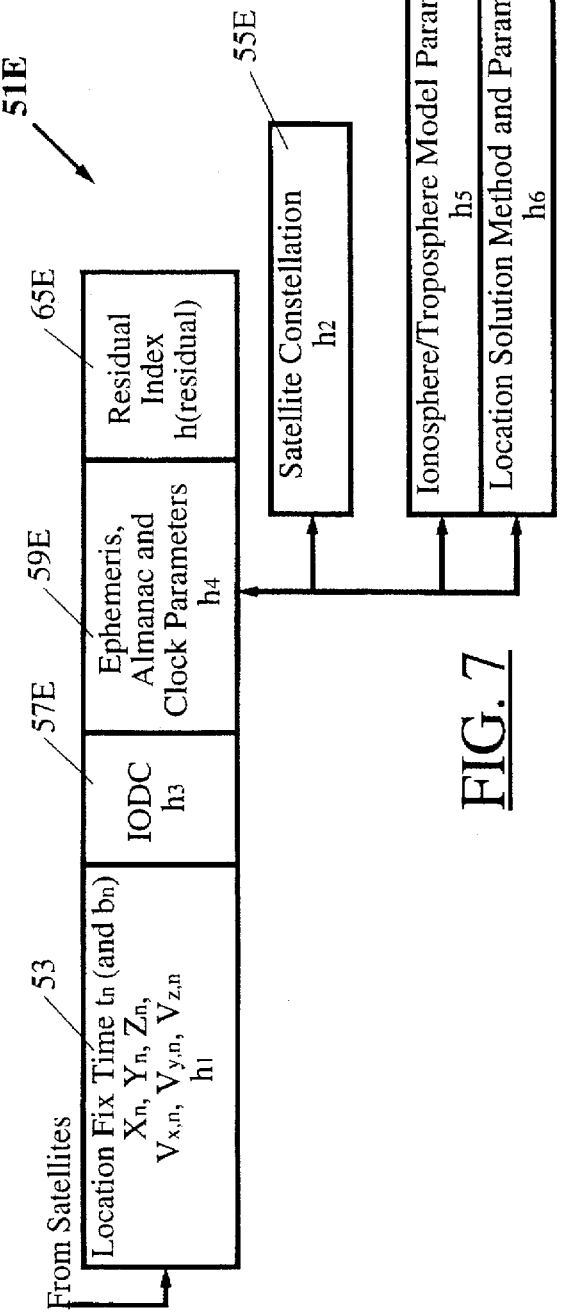
FIG. 7 illustrates an embodiment in which the IODC parameter and the ephemeris, almanac and clock parameters are dynamic.

In a fifth approach, illustrated in FIG. 7: (1) the indices h1, h3 and h4 are dynamic and are contained in allocated regions 53, 57E and 59E; (2) the index h2 is semi-dynamic (or static) and contained in an allocated region 55E of memory; and (3) the indices h5 and h6 are static and are contained in allocated regions 61E and 63E of memory. An information tag 51E contains the indices h1, h3 and h4 and contains a residual index in an allocated region 65E of memory, that refers to the remaining indices.

In a sixth approach, illustrated in FIG. 8: (1) the indices h1 and h5 are dynamic and are contained in allocated regions 53 and 61F; (2) the indices h2 and h3 are semi-dynamic (or static) and are contained in allocated regions 55F and 57F of memory; and (3) the indices h4 and h6 are static and are contained in allocated regions 59F and 63F of memory. An information tag 51F contains the indices h1 and h5 and contains a residual index in an allocated region 65F of memory, that refers to the remaining indices.

In a seventh approach, illustrated in FIG. 9: (1) the indices h1, h2 and h6 are dynamic and are contained in allocated regions 53, 55G and 63G; (2) the index h3 is semi-dynamic (or static) and contained in an allocated region 57G of memory; and (3) the indices h4 and h5 are static and are contained in allocated regions 59G and 61G of memory. An information tag 51G contains the indices h1, h2 and h6 and contains a residual index in an allocated region 65G of memory, that refers to the remaining indices.

In an eighth approach, illustrated in FIG. 10: (1) the indices h1, h2, h3, h5 and h6 are dynamic and are contained in allocated regions 53, 55H, 57H, 61H and 63H of memory; and (2) the index h4 is semi-dynamic (or static) and contained in an allocated region 59H of memory. An information tag 51H contains the indices h1, h2, h3, h5 and h6 and contains a residual index in an allocated region 65H of memory, that refers to the remaining index.

In a ninth approach, illustrated in FIG. 11: (1) the indices h1, h2, h3, h4 and h6 are dynamic and are contained in allocated regions 53, 55I, 57I, 59I and 63I of memory; and (2) the index h5 is semi-dynamic (or static) and contained in an allocated region 61I of memory. An information tag 51H contains the indices h1, h2, h3, h4 and h6 and contains a residual index in an allocated region 65I of memory, that refers to the remaining index.

In a tenth approach, illustrated in FIG. 12: (1) the indices h1, h2, h3, h4 and h5 are dynamic and are contained in allocated regions 53, 55J, 57J, 59J and 61J of memory; and (2) the index h6 is semi-dynamic (or static) and contained in an allocated region 63J of memory. An information tag 51J contains the indices h1, h2, h3, h4 and h5 and contains a residual index in an allocated region 65J of memory, that refers to the remaining index.

In an eleventh approach, illustrated in FIG. 13, all the indices h1, h2, h3, h4, h5 and h6 are dynamic and are contained in allocated regions 53, 55K, 57K, 59K, 61K and 63K of memory. An information tag 51K contains the indices h1, h2, h3, h4, h5 and h6 and may contain a residual index in an allocated region 65K of memory, if any additional parameters need to be referred to.

The information necessary to specify or refer to all the information required to reconstruct the pseudorange and/or carrier phase signals used to determine a total location solution $(t_n, x_n, y_n, z_n)$ is specified or pointed to by six indices, in the embodiments discussed above. Six indices are used here because the corresponding information referred to by each index corresponds roughly to natural groupings of information referred to in the ICD-200 document. The number of indices used here can be one, two, three, four, five, seven or more as well as six. For example, the ephemeris, almanac and clock parameters, referred to by a single index h4, could be referred to by two, three or more indices, depending upon other considerations. The ionosphere model parameters and the (optional) troposphere model parameters, referred to by a single index h5, could be referred to by two or more indices. The location solution method and method parameters, referred to be a single index h6, could be referred to by two or more indices. Alternatively, information referred to by two or more of the indices h1, h2, h3, h4 h5 and/or h6 could be combined and referred to by fewer than six indices. For example, the IOCD parameter (index h3) could be absorbed into and expressed as a part of the index h4.

FIG. 13 also illustrates an approach in which all information could be included in a single omnibus index H, which may have two or more sub-indices, that specifies or refers to part or all of the information set forth in Eqs. (1), (3), (4), (17), (48) and (56) (or (54) or (55)).

(57)

$H = (t_n, x_n, y_n, z_n, v_{x,n}, v_{y,n}, v_{z,n}; SC, P; IODC; CODE, WN, L2/P,$
$SVAccuracy, SVHealth, T_{GD}(sec), t_{oc}(sec), a_{f2}(sec^{-1}), a_{f1},$
$a_{f0}(sec), IODE, C_{uc}(meters), C_{rs}(meters), C_{sc}(meters),$
$\Delta n(sec^{-1}), M_o, C_{uc}(rad), C_{sc}(rad), e, A^{1/2}(meters^{1/2}), t_{oe}(sec),$
$C_{ic}(rad), C_{is}(rad), OMEGA_o, OMEGADOT(sec^{-1}), i_o, \omega,$
$t_{oe}(sec), e, \Phi_L, \delta u_k, IDOT, C_{us}(rad), \delta 1, SVConfig, A0(sec),$
$A1, \Delta t_{LS}(sec), \Delta t_{LSF}(sec), t_{oi}(sec), WN_t, WN_{LSF}, DN; \alpha_0, \alpha_1,$
$\alpha_2, \alpha_3, \beta_0, \beta_1, \beta_2, \beta_3, MP_{tropo}, t_{oa}, WN_8, a_{f0}(sec), a_{f1}, a, b,$ —continued
$f(sec^{-1}), E, A, \phi_m, t_{oi}(sec), WN_{LSF}, WN_t, DN, HN, \tau, t_{SV},$
$CH, \phi_u, \lambda_u; K, M_i; \pi_i).$ The index H may be divided into two or more segments that include: (1) a first index segment H1 that contains or refers to the total location solution coordinates $(t_n, x_n, y_n, z_n)$ and any other parameters or attributes that are likely to change with each new location fix time $t=t_n$; and (2) a second index segment H2 that contains or refers to only parameters and attributes that are likely to change less often, such as at most once in a time interval of length $\Delta t_{change}$, where $\Delta t_{change}$ is a selected length of a time interval. This second segment can be broken down further into two or more such index segments, denoted 2A and 2B here, each of which contains or refers to a group of parameters or attributes with a different expected time interval length for change, $\Delta t_{change, 2A}$ and $\Delta t_{change, 2B}$. For example, the index segment 2A could contain or refer to parameters that are likely to change at most once in every rth location fix, where r=2–10, and the index segment 2B could contain or refer to parameters that are likely to change at most once in every rth location fix, where r>10.

Although the index or indices used in the invention refer to information contained in GPS signals received from a plurality of GPS satellites, the information received may be contained in Satellite Positioning System (SATPS) signals received from a plurality of SATPS satellites that are similar to the GPS satellites. A Satellite Positioning System is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f(delay∝f$^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, ..., 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably three or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

We claim:

1. A method for characterization and use of data measurements made on signals received from a plurality of SATPS satellites that facilitates subsequent processing of these data and determination of a spatial location corresponding to these measurements, the method comprising the steps of:

receiving SATPS signals at an SATPS antenna from each satellite in a selected constellation of M SATPS satellites (M≧3), where the SATPS signals can be used to determine location fix coordinates $(t_n, x_n, y_n, z_n)$, consisting of a location fix time $t = t_n$ and the corresponding location coordinates $(x_n, y_n, z_n)$ for the SATPS antenna that are determined from the SATPS signals received from the selected constellation of M SATPS satellites at the location fix time $t = t_n$;

filtering the received SATPS signals to produce selected signal bit information by removing redundant signal bit information, and storing the selected signal bit information;

associating each signal bit of the selected signal bit information with at least one of six information indices, numbered h1, h2, h3, h4, h5 and h6, where the six information indices are associated with the following information:

a first index h1 that specifies, for each location fix, the total solution coordinates $(t_n, x_n, y_n, z_n)$ for that location fix;

a second index h2 that specifies each of the satellites in a selected constellation of M satellites, with $M \geq 4$, for a location fix determined for at least two distinct location fix times;

a third index h3 that specifies IODC parameter for the selected constellation of M SATPS satellites for the location fix time $t=t_n$;

a fourth index h4 that specifies at least one of (1) the ephemeris parameters, (2) the almanac parameters, and (3) the clock correction parameters that were used in determining the total solution coordinates $(t_n, x_n, y_n, z_n)$;

a fifth index h5 that specifies at least one of (1) the ionospheric model parameters and (2) the tropospheric model parameters that were used in determining the signal propagation time delays and the total solution coordinates $(t_n, x_n, y_n, z_n)$; and a sixth index h6 that specifies the location solution method and the location solution method parameters used in determining the total solution coordinates $(t_n, x_n, y_n, z_n)$;

when corrected pseudorange data or corrected carrier phase data corresponding to the total solution coordinates $(t_n, x_n, y_n, z_n)$ are required, reading the total solution coordinates $(t_n, x_n, y_n, z_n)$ into a digital computer that is programmed to determine at least one of pseudorange data and carrier phase data from a set of total solution coordinates $(t_n, x_n, y_n, z_n)$, reading the information associated with at least one of the six indices h1, h2, h3, h4, h5 and h6 associated with the total solution coordinates $(t_n, x_n, y_n, z_n)$ into the computer, and causing the computer to reconstruct at least one of the required pseudorange data and the required carrier phase data from the information associated with the six indices;

receiving differential SATPS correction signals associated with at least one location fix time $t=t_{n1}$;

correcting the reconstructed pseudorange data or reconstructed carrier phase data, using the received differential SATPS correction signals for the at least one location fix time $t=t_{n1}$; and using the corrected reconstructed pseudorange data or corrected reconstructed carrier phase data to determine and display at least one corrected location coordinate $t_n$, $x_n$, $y_n$, and $z_n$ for the at least one location fix time $t=t_{n1}$.

2. The method of claim 1, further comprising the steps of:

determining and storing the velocity coordinates $(v_{x,n}, v_{y,n}, v_{z,n})$ from signals received from said selected constellation of M SATPS satellites for said location fix time $t=t_n$; and constructing an augmented first index h1' that specifies said total coordinates $(t_n, x_n, y_n, z_n)$ and the velocity coordinates $(v_{x,n}, v_{y,n}, v_{z,n})$ for said location fix time $t=t_n$, and replacing said index h1 by the augmented index h1'.

3. The method of claim 1, wherein said step of determining said second index comprises the steps of:

assigning a consecutive set of integers $k=0, 1, 2, \ldots, K-1$ to a selected set of SATPS satellites that includes said M satellites that form said constellation at time $t=t_n$; and defining said index $h2=h2(t_n)$ as a sum $$h2(t_n) = \left( A \sum_{k=0}^{K-1} a_{k,n} w^k + B \right)^c,$$

where $a_{k,n}=1$ if satellite number k is part of said constellation at time $t=t_n$ and $a_{k,n}=0$ otherwise, and A, B and C are selected constants with $A \neq 0$ and w is a selected constant different from 1.

4. The method of claim 1, further comprising the step of selecting said fourth index $h4=h4(t_n)$ from a selected subset of the following parameters used to describe the path followed by a satellite that is part of the SATPS: {CODE, WN, L2/P, SV Accuracy, SVHealth, $T_{GD}$(sec), IODC, $t_{oc}$ (sec), $a_{f2}$(sec$^{-1}$), $a_{f1}$, $a_{f0}$(sec), IODE, $C_{rc}$(meters), $C_{sc}$(meters), $\Delta n$(sec$^{-1}$), $M_o$, $C_{uc}$(rad), $C_{sc}$(rad), $\epsilon$, $A^{1/2}$(meters$^{1/2}$), $t_{oe}$(sec), $C_{ic}$(rad), $C_{is}$(rad), OMEGA$_o$, OMEGADOT(sec$^{-1}$), $i_o$, $\omega$, $t_{oe}$(sec), e, $\Phi_k$, $\delta u_k$, IDOT, $C_{us}$(rad), $C_{rs}$(rad), $\delta 1$, SVConfig, A0(sec), A1, $\Delta t_{LS}$(sec), $\Delta t_{LSF}$(sec), $t_{ot}$(sec), WN$_t$, WN$_{LSF}$, DN}.

5. The method of claim 1, further comprising the step of selecting said fifth index $h5=h5(t_n)$ from a selected subset of the following parameters used to describe the path followed by a satellite that is part of the SATPS: {($\alpha_0$, $\alpha_1$, $\alpha_2$, $\alpha_3$, $\beta_0$, $\beta_1$, $\beta_2$, $\beta_3$, $t_{oa}$, WN$_s$, $a_{f0}$(sec), $a_{f1}$, $A_0$(sec), $A_1$, a, b, f(sec$^{-1}$), E, A, $\phi_m$, $t_{ot}$(sec), DN, WN, WN$_{LSF}$, WN$_t$, $\phi_u$, $\lambda_u$}.

6. The method of claim 1, further comprising the step of selecting said sixth index $h6=h6(t_n)$ from a selected subset of the following parameters used to describe the path followed by a satellite that is part of the SATPS: {K, $M_i$, $\pi_i$; $t_n$, $x_n$, $y_n$, $z_n$}, where K is the number of satellites in the present constellation, $M_i$ refers to the method used to determine the location solution from the SATPS signals received, $\pi_i$ is the set of parameters to be used with the method $M_i$, and $(t_n, x_n, y_n, z_n)$ are the temporal and spatial coordinates for the present location determined at the location fix time $t=t_n$.

7. The method of claim 1, further comprising the step of selecting said fourth index h4 and said fifth index h5 so that no information specified by one of these two indices is also specified by the other of these indices.

8. The method of claim 1, further comprising the steps of:

adding to said selected signal bit information associated with said index h1 each time additional SATPS signals are received that can be used to determine a set of location fix coordinates $(t_n, x_n, y_n, z_n)$ in which at least one of said tour location fix coordinates, $t_n$, $x_n$, $y_n$, and $z_n$, has changed from a preceding set of said location coordinates $(t_n, x_n, y_n, z_n)$;

adding to said selected signal bit information associated with at least one of said index h2 and said index h3 each time additional SATPS signals are received that causes at least of (1) said selected constellation of M satellites and (2) said IODC parameter for said selected constellation of M satellites to change; and adding to said selected signal bit information associated with at least one of said index h4, said index h5 and said index h6 each time additional SATPS signals are received that causes at least of (1) said set of ephemeris parameters, (2) said set of almanac parameters, (3) said set of clock correction parameters, (4) said set of ionospheric parameters, (5) said set of tropospheric parameters and (6) said location solution method or said location solution method parameters used in determining said total solution coordinates to change.

9. The method of claim 1, further comprising the steps of:

adding to said selected signal bit information associated with at least one of said index h1 and said index h2 each time additional SATPS signals are received that can be used to determine a set of location fix coordinates $(t_n, x_n, y_n, z_n)$ in which at least one of said four location fix coordinates, $t_n$, $x_n$, $y_n$, and $z_n$, has changed from a preceding set of said location coordinates $(t_n, x_n, y_n, z_n)$, or that causes said selected constellation of M satellites to change;

adding to said selected signal bit information associated with said index h3 each time additional SATPS signals are received that causes said IODC parameter for said selected constellation of M satellites to change; and adding to said selected signal bit information associated with at least one of said index h4, said index h5 and said index h6 each time additional SATPS signals are received that causes at least of (1) said set of ephemeris parameters, (2) said set of almanac parameters, (3) said set of clock correction parameters, (4) said set of ionospheric parameters, (5) said set of tropospheric parameters and (6) said location solution method or said location solution method parameters used in determining said total solution coordinates to change.

10. The method of claim 1, further comprising the steps of:

adding to said selected signal bit information associated with at least one of said index h1 and said index h3 each time additional SATPS signals are received that can be used to determine a set of location fix coordinates $(t_n, x_n, y_n, z_n)$ in which at least one of said four location fix coordinates, $t_n$, $x_n$, $y_n$, and $z_n$, has changed from a preceding set of said location coordinates $(t_n, x_n, y_n, z_n)$, or that causes said IODC parameter for said selected constellation of M satellites to change;

adding to said selected signal bit information associated with said index h2 each time additional SATPS signals are received that causes said selected constellation of M satellites to change; and adding to said selected signal bit information associated with at least one of said index h4, said index h5 and said index h6 each time additional SATPS signals are received that causes at least of (1) said set of ephemeris parameters, (2) said set of almanac parameters, (3) said set of clock correction parameters, (4) said set of ionospheric parameters, (5) said set of tropospheric parameters and (6) said location solution method or said location solution method parameters used in determining said total solution coordinates to change.

11. The method of claim 1, further comprising the steps of:

adding to said selected signal bit information associated with at least one of said index h1, said index h2 and said index h3 each time additional SATPS signals are received that can be used to determine a set of location fix coordinates $(t_n, x_n, y_n, z_n)$ in which at least one of said four location fix coordinates, $t_n$, $x_n$, $y_n$, and $z_n$, has changed from a preceding set of said location coordinates $(t_n, x_n, y_n, z_n)$, or that causes at least of (1) said selected constellation of M satellites and (2) said IODC parameter for said selected constellation of M satellites to change; and adding to said selected signal bit information associated with at least one of said index h4, said index h5 and said index h6 each time additional SATPS signals are received that causes at least of (1) said set of ephemeris parameters, (2) said set of almanac parameters, (3) said set of clock correction parameters, (4) said set of ionospheric parameters, (5) said set of tropospheric parameters and (6) said location solution method or said location solution method parameters used in determining said total solution coordinates to change.

12. The method of claim 1, further comprising the steps of:

adding to said selected signal bit information associated with at least one of said index h1, said index h3 and said index h4 each time additional SATPS signals are received that can be used to determine a set of location fix coordinates $(t_n, x_n, y_n, z_n)$ in which at least one of said four location fix coordinates, $t_n$, $x_n$, $y_n$, and $z_n$, has changed from a preceding set of said location coordinates $(t_n, x_n, y_n, z_n)$, or that causes at least one of (1) said IODC parameter for said selected constellation of M satellites, (2) said set of ephemeris parameters, (3) said set of almanac parameters, (4) said set of clock correction parameters to change;

adding to said selected signal bit information associated with said index h2 each time additional SATPS signals are received that causes said selected constellation of M satellites to change; and adding to said selected signal bit information associated with at least one of said index h5 and said index h6 each time additional SATPS signals are received that causes at least of (1) said set of ionospheric parameters, (2) said set of tropospheric parameters and (3) said location solution method or said location solution method parameters used in determining said total solution coordinates to change.

13. The method of claim 1, further comprising the steps of:

adding to said selected signal bit information associated with said index h1 each time additional SATPS signals are received that can be used to determine a set of location fix coordinates $(t_n, x_n, y_n, z_n)$ in which at least one of said four location fix coordinates, $t_n$, $x_n$, $y_n$, and $z_n$, has changed from a preceding set of said location coordinates $(t_n, x_n, y_n, z_n)$, or that causes at least one of (1) said set of ionospheric parameters and (2) said set of tropospheric parameters to change adding to said selected signal bit information associated with at least one of said index h2 and said index h3 each time additional SATPS signals are received that causes at least of (1) said selected constellation of M satellites and (2) said IODC parameter for said selected constellation of M satellites to change; and adding to said selected signal bit information associated with at least one of said index h4 and said index h6 each time additional SATPS signals are received that causes at least of (1) said set of ephemeris parameters, (2) said set of almanac parameters, (3) said set of clock correction parameters and (4) said location solution method or said location solution method parameters used in determining said total solution coordinates to change.

14. The method of claim 1, further comprising the steps of:

adding to said selected signal bit information associated with at least one of said index h1, said index h2 and said index h6 each time additional SATPS signals are received that can be used to determine a set of location fix coordinates $(t_n,x_n,y_n,z_n)$ in which at least one of said four location fix coordinates, $t_n$, $x_n$, $y_n$, and $z_n$, has changed from a preceding set of said location coordinates $(t_n,x_n,y_n,z_n)$, or that causes at least one of (1) said selected constellation of satellites and (2) said location solution method or said location solution method parameters used in determining said total solution coordinates to change;

adding to said selected signal bit information associated with said index h3 each time additional SATPS signals are received that causes said IODC parameter for said selected constellation of M satellites to change; and adding to said selected signal bit information associated with at least one of said index h4 and said index h5 each time additional SATPS signals are received that causes at least of (1) said set of ephemeris parameters, (2) said set of almanac parameters, (3) said set of clock correction parameters, (4) said set of ionospheric parameters and (5) said set of tropospheric parameters to change.

15. The method of claim 1, further comprising the steps of:

adding to said selected signal bit information associated with at least one of said index h1, said index h2, said index h3, said index h5 and said index h6 each time additional SATPS signals are received that can be used to determine a set of location fix coordinates $(t_n,x_n,y_n, z_n)$ in which at least one of said four location fix coordinates, $t_n$, $x_n$, $y_n$, and $z_n$, has changed from a preceding set of said location coordinates $(t_n,x_n,y_n,z_n)$, or that causes at least of (1) said selected constellation of M satellites, (2) said IODC parameter for said selected constellation of M satellites, (3) said set of ionospheric parameters, (4) said set of tropospheric parameters and (5) said location solution method or said location solution method parameters used in determining said total solution coordinates to change; and adding to said selected signal bit information associated with said index h4 each time additional SATPS signals are received that causes at least of (1) said set of ephemeris parameters, (2) said set of almanac parameters, (3) said set of clock correction parameters to change.

16. The method of claim 1, further comprising the steps of:

adding to said selected signal bit information associated with at least one of said index h1, said index h2, said index h3, said index h4 and said index h6 each time additional SATPS signals are received that can be used to determine a set of location fix coordinates $(t_n,x_n,y_n, z_n)$ in which at least one of said four location fix coordinates, $t_n$, $x_n$, $y_n$, and $z_n$, has changed from a preceding set of said location coordinates $(t_n,x_n,y_n,z_n)$, or that causes at least of (1) said selected constellation of M satellites, (2) said IODC parameter for said selected constellation of M satellites, (3) said set of ephemeris parameters, (4) said set of almanac parameters, (5) said set of clock correction parameters and (5) said location solution method or said location solution method parameters used in determining said total solution coordinates to change; and adding to said selected signal bit information associated with said index h5 each time additional SATPS signals are received that causes at least of (1) said set of ionospheric parameters and (2) said set of tropospheric parameters to change.

17. The method of claim 1, further comprising the steps of:

adding to said selected signal bit information associated with at least one of said index h1, said index h2, said index h3, said index h4 and said index h5 each time additional SATPS signals are received that can be used to determine a set of location fix coordinates $(t_n,x_n,y_n, z_n)$ in which at least one of said four location fix coordinates, $t_n$, $x_n$, $y_n$, and $z_n$, has changed from a preceding set of said location coordinates $(t_n,x_n,y_n,z_n)$, or that causes at least of (1) said selected constellation of M satellites, (2) said IODC parameter for said selected constellation of M satellites, (3) said set of ephemeris parameters, (4) said set of almanac parameters, (5) said set of clock correction parameters and (6) said set of ionospheric parameters and (7) said set of tropospheric parameters to change; and adding to said selected signal bit information associated with said index h6 each time additional SATPS signals are received that causes said location solution method or said location solution method parameters used in determining said total solution coordinates to change.

18. The method of claim 1, further comprising the steps of:

adding to said selected signal bit information associated with at least one of said index h1, said index h2, said index h3, said index h4, said index h5 and said index h6 each time additional SATPS signals are received that can be used to determine a set of location fix coordinates $(t_n,x_n,y_n,z_n)$ in which at least one of said four location fix coordinates, $t_n$, $x_n$, $y_n$, and $z_n$, has changed from a preceding set of said location coordinates $(t_n, x_n,y_n,z_n)$, or that causes at least of (1) said selected constellation of M satellites, (2) said IODC parameter for said selected constellation of M satellites, (3) said set of ephemeris parameters, (4) said set of almanac parameters, (5) said set of clock correction parameters, (6) said set of ionospheric parameters, (7) said set of tropospheric parameters and (8) said location solution method or said location solution method parameters used in determining said total solution coordinates to change.

19. A method for characterization and use of data measurements made on signals received from a plurality of SATPS satellites that facilitates subsequent processing of these data and determination of a spatial location corresponding to these measurements, the method comprising the steps of:

receiving SATPS signals at an SATPS antenna from each satellite in a selected constellation of M SATPS satellites (M≧3), where the SATPS signals can be used to determine location fix coordinates $(t_n,x_n,y_n,z_n)$, consisting of a location fix time $t=t_n$ and the corresponding location coordinates $(x_n,y_n,z_n)$ for the SATPS antenna that are determined from the SATPS signals received from the selected constellation of M SATPS satellites at the location fix time $t=t_n$;

filtering the received SATPS signals to produce selected signal bit information by removing redundant signal bit information, and storing the selected signal bit information;

associating each signal bit of the selected signal bit information with an information index H that specifies, for each location fix, the total solution coordinates ($t_n,x_n,y_n,z_n$) for that location fix, consisting of a location fix time $t=t_n$ and the corresponding spatial location coordinates ($x_n,y_n,z_n$) that are determined from signals received from the selected constellation of M SATPS satellites for each location fix time, where the index H also includes at least one of the following parameters: $v_{x,n}$, $v_{y,n}$, $v_{z,n}$; SC, P; IODC; CODE, WN, L2/P, SV Accuracy, SVHealth, $T_{GD}$(sec), $t_{oc}$(sec), $a_{f2}$(sec$^{-1}$), $a_{f1}$, $a_{f0}$(sec), IODE, $C_{rc}$(meters), $C_{sc}$(meters), $\Delta n$(sec$^{-1}$), $M_o$, $C_{uc}$(rad), $C_{sc}$(rad), $\epsilon$, $A^{1/2}$(meters$^{1/2}$), $t_{oe}$(sec), $C_{ic}$(rad), $C_{is}$(rad), OMEGA$_o$, OMEGADOT(sec$^{-1}$), $i_o$, $\omega$, $t_{oe}$(sec), e, $\Phi_k$, $\delta u_k$, IDOT, $C_{us}$(rad), $C_{rs}$(rad), $\delta 1$, SVConfig, A0(sec), A1, $\Delta t_{LS}$(sec), $\Delta t_{LSF}$(sec), $t_{ot}$(sec), WN$_t$, WN$_{LSF}$, DN; $\alpha_0$, $\alpha_1$, $\alpha_2$, $\alpha_3$, $\beta_0$, $\beta_1$, $\beta_2$, $\beta_3$, MP$_{tropo}$, $t_{oa}$, WN$_8$, $a_{f0}$(sec), $a_{f1}$, a, b, f(sec$^{-1}$), E, A, $\phi_m$, $t_{ot}$(sec), WN$_{LSF}$, WN$_t$, $\phi_u$, $\lambda_u$; K, $M_i$, and $\pi_i$;

when corrected pseudorange data or corrected carrier phase data corresponding to the total solution coordinates ($t_n,x_n,y_n,z_n$) are required, reading the total solution coordinates ($t_n,x_n,y_n,z_n$) into a digital computer that is programmed to determine at least one of pseudorange data and carrier phase data from a set of total solution coordinates ($t_n,x_n,y_n,z_n$), reading the information associated with the index H associated with the total solution coordinates ($t_n,x_n,y_n,z_n$) into the computer, and causing the computer to reconstruct at least one of the required pseudorange data and the required carrier phase data from the information associated with the six indices;

receiving differential SATPS correction signals associated with at least one location fix time $t=t_{n1}$;

correcting the reconstructed pseudorange data or reconstructed carrier phase data, using the received differential SATPS correction signals for the at least one location fix time $t=t_{n1}$; and using the corrected reconstructed pseudorange data or corrected reconstructed carrier phase data to determine and display at least one corrected location coordinate $t_n$, $x_n$, $y_n$, and $z_n$ for the at least one location fix time $t=t_{n1}$.

20. The method of claim 19, further comprising the step of dividing said index H into a first segment H1 that refers to or contains said total solution coordinates ($t_n,x_n,y_n,z_n$) and at least one other of said parameters that is likely to change each time said location fix time $t=t_n$ changes, and at least one other index segment H2 that contains only parameters that are likely to change less often than every time said location fix time $t=t_n$ changes.

21. The method of claim 20, further comprising the step of determining and storing the velocity coordinates ($v_{x,n},v_{y,n},v_{z,n}$) from signals received from said selected constellation of M SATPS satellites, as part of said index H1, for said location fix time $t=t_n$.

* * * * *